US011234262B2

(12) United States Patent
Manolakos et al.

(10) Patent No.: US 11,234,262 B2
(45) Date of Patent: Jan. 25, 2022

(54) CONFIGURATION OF APERIODIC SOUNDING REFERENCE SIGNAL TRANSMISSION AND TRIGGERING

(71) Applicant: QUALCOMM Incorporated, San Diego, CA (US)

(72) Inventors: Alexandros Manolakos, San Diego, CA (US); Amir Aminzadeh Gohari, Sunnyvale, CA (US); Joseph Binamira Soriaga, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 16/269,903

(22) Filed: Feb. 7, 2019

(65) Prior Publication Data
US 2019/0254061 A1    Aug. 15, 2019

(30) Foreign Application Priority Data

Feb. 15, 2018 (GR) .............................. 20180100057

(51) Int. Cl.
*H04W 72/14* (2009.01)
*H04L 5/00* (2006.01)
(Continued)

(52) U.S. Cl.
CPC ........... *H04W 72/14* (2013.01); *H04L 5/0007* (2013.01); *H04L 5/0048* (2013.01);
(Continued)

(58) Field of Classification Search
CPC ............ H04L 25/0224; H04L 27/2613; H04L 5/0007; H04L 5/0023; H04L 5/0048;
(Continued)

(56) References Cited

U.S. PATENT DOCUMENTS

2014/0016475 A1\* 1/2014 Zhou ...................... H04W 28/12
370/236
2014/0269460 A1\* 9/2014 Papasakellariou .... H04L 5/0053
370/294

(Continued)

OTHER PUBLICATIONS

International Search Report and Written Opinion—PCT/US2019/017195—ISA/EPO—dated Jul. 29, 2019 (182058WO).
(Continued)

*Primary Examiner* — Awet Haile
(74) *Attorney, Agent, or Firm* — Holland & Hart LLP

(57) ABSTRACT

Methods, systems, and devices for wireless communications are described that support configuration of aperiodic sounding reference signal transmission and triggering. A base station may transmit, within a first transmission time interval (TTI), a grant triggering a user equipment (UE) to transmit an aperiodic sounding reference signal (A-SRS), and may identify offset information indicating a TTI offset relative to the grant. The base station may determine a second TTI for the A-SRS based on the TTI offset. A UE may detect, within a first TTI, the grant triggering the UE to transmit the A-SRS, identify the offset information indicating the TTI offset relative to the grant, and determine the second TTI for transmitting the A-SRS based on the TTI offset. The UE may transmit the A-SRS in an SRS resource of the second TTI, and the base station may monitor the SRS resource of the second TTI for the A-SRS.

29 Claims, 21 Drawing Sheets

(51) Int. Cl.
*H04L 25/02* (2006.01)
*H04L 27/26* (2006.01)

(52) U.S. Cl.
CPC .......... *H04L 5/0051* (2013.01); *H04L 5/0082* (2013.01); *H04L 5/0091* (2013.01); *H04L 5/0023* (2013.01); *H04L 5/0069* (2013.01); *H04L 25/0224* (2013.01); *H04L 27/2613* (2013.01)

(58) Field of Classification Search
CPC ... H04L 5/0051; H04L 5/0069; H04L 5/0082; H04L 5/0091; H04W 72/14
See application file for complete search history.

(56) References Cited

U.S. PATENT DOCUMENTS

| | | |
|---|---|---|
| 2016/0088614 A1 | 3/2016 | Noh et al. |
| 2017/0150499 A1 | 5/2017 | Kim et al. |
| 2017/0302419 A1* | 10/2017 | Liu ........................ H04L 5/0078 |
| 2017/0331606 A1 | 11/2017 | Chen et al. |
| 2018/0020431 A1* | 1/2018 | Cho ........................ H04W 76/20 |
| 2020/0068557 A1* | 2/2020 | Lee ........................ H04W 16/32 |
| 2020/0137592 A1* | 4/2020 | Guo ........................ H04W 16/28 |
| 2020/0169375 A1* | 5/2020 | Yi .......................... H04L 5/001 |

OTHER PUBLICATIONS

Motorola Mobility: "Remaining Details of Aperiodic SRS", 3GPP Draft, R1-110875 Aperiodic SRS, 3RD Generation Partnership Project (3GPP) Mobile Competence Centre, 650 Route Des Lucioles, F-06921, Sophia-Antipolis Cedex, France, vol. RAN WG1, Taipei, Taiwan, XP050490775, Feb. 17, 2011 (Feb. 17, 2011), pp. 1-5, Sections 1, 2.1, 2.2, 3.1, 5, 6.
Partial International Search Report—PCT/US2019/017195—ISA/ EPO—dated May 21, 2019 (182058WO).

* cited by examiner

CONFIGURATION OF APERIODIC SOUNDING REFERENCE SIGNAL TRANSMISSION AND TRIGGERING

CROSS REFERENCES

The present application for patent claims the benefit of Greece Provisional Patent Application No. 20180100057 by Manolakos, et al., entitled "Configuration of Aperiodic Sounding Reference Signal Transmission and Triggering," filed Feb. 15, 2018, assigned to the assignee hereof, and expressly incorporated by reference herein.

BACKGROUND

The following relates generally to wireless communication, and more specifically to configuration of aperiodic sounding reference signal transmission and triggering.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some examples of a wireless communications system, communications between a UE and a base station may include communication of sounding reference signals (SRSs). An SRS may be signal known by each of the UE and the base station. The UE may transmit the SRS, and the base station may receive and measure the SRS for generating a channel estimate of a wireless channel between the UE and the base station. In some cases, the base station may use the channel estimate for identifying whether a particular frequency band is experiencing high levels of interference and/or noise, and make frequency dependent scheduling determinations based on one or more determined channel estimates. In some examples, an SRS may be transmitted aperiodically, semi-persistently, or periodically. However, SRS transmission schemes in conventional wireless communication systems are deficient.

SUMMARY

The described techniques relate to improved methods, systems, devices, or apparatuses that support configuration of aperiodic sounding reference signal transmission and triggering. Generally, the described techniques provide for aperiodic triggering of a user equipment (UE) to transmit a sounding reference signal (SRS) in a transmission time interval (TTI) relative to a TTI in which the UE receives a grant. In some examples, a UE may receive a grant that triggers the transmission of an aperiodic SRS, and the UE may identify offset information indicating a TTI offset between the TTI in which the triggering grant is received, and the TTI in which the aperiodic SRS is to be transmitted. In some examples, the TTI in which the aperiodic SRS is to be transmitted may be a function of the amount of time required by the UE to process a grant relative to when the UE is capable of transmitting in accordance with the grant.

In some examples, a UE may receive downlink control information (DCI) that includes a downlink grant or an uplink grant, and in response the UE, may transmit SRS to a base station in a TTI relative to a TTI that included the grant. In some examples, the UE may transmit the SRS on SRS resource in an earliest available TTI following a TTI in which the grant is received, which may be as early as the same TTI that included the grant. In some examples, the transmission timing of the SRS may be identified based on TTI offset information. The UE may be preconfigured with the TTI offset information, or the TTI offset information may be received via RRC signaling, or included in DCI. The UE may identify the TTI offset information and determine a TTI offset, and may use the TTI offset to determine in which TTI to transmit the SRS relative to the TTI in which the grant is received.

In some cases, a UE may signal its capabilities to the base station, or the base station may be aware of default UE capabilities for UEs operating within a wireless communication system. The base station may determine in which TTI to instruct the UE to transmit uplink data, or to receive downlink data, and generate a grant accordingly. The base station may also identify, based on the signaled UE capabilities or default capabilities, in which TTI the UE is expected to transmit the SRS relative to the grant. The base station may monitor SRS resource of the expected TTI for the SRS. Beneficially, a UE may be configured to transmit an SRS at an earlier or earliest available TTI following the reception of DCI.

A method of wireless communication is described. The method may include detecting, within a first TTI, a grant triggering the UE to transmit an aperiodic sounding reference signal (A-SRS), identifying offset information indicating a TTI offset relative to the grant, determining a second TTI for transmitting the A-SRS based at least in part on the TTI offset, and transmitting the A-SRS in an SRS resource of the second TTI.

An apparatus for wireless communication is described. The apparatus may include means for detecting, within a first TTI, a grant triggering the UE to transmit an A-SRS, means for identifying offset information indicating a TTI offset relative to the grant, means for determining a second TTI for transmitting the A-SRS based at least in part on the TTI offset, and means for transmitting the A-SRS in an SRS resource of the second TTI.

Another apparatus for wireless communication is described. The apparatus may include a processor, memory in electronic communication with the processor, and instructions stored in the memory. The instructions may be operable to cause the processor to detect, within a first TTI, a grant triggering the UE to transmit an A-SRS, identify offset information indicating a TTI offset relative to the grant, determine a second TTI for transmitting the A-SRS based at least in part on the TTI offset, and transmit the A-SRS in an SRS resource of the second TTI.

A non-transitory computer-readable medium for wireless communication is described. The non-transitory computer-readable medium may include instructions operable to cause a processor to detect, within a first TTI, a grant triggering the UE to transmit an A-SRS, identify offset information indicating a TTI offset relative to the grant, determine a second TTI for transmitting the A-SRS based at least in part on the TTI offset, and transmit the A-SRS in an SRS resource of the second TTI.

In some examples of the method, apparatus, and non-transitory computer-readable medium described above, receiving configuration information that configures the UE to transmit the A-SRS within at least one symbol index of a plurality of different symbol indexes of a TTI, wherein transmitting the A-SRS in the SRS resource of the second TTI further comprises: transmitting the A-SRS within at least one symbol period of the second TTI corresponding to the at least one symbol index.

In some examples of the method, apparatus, and non-transitory computer-readable medium described above, identifying the offset information further comprises: receiving the offset information in downlink control information of the first TTI, wherein the offset information indicates a delay corresponding to a number of TTIs occurring between receipt of the grant by the UE and when the UE may be instructed to transmit uplink data in accordance with the grant.

In some examples of the method, apparatus, and non-transitory computer-readable medium described above, determining the second TTI further comprises: determining a TTI index following the delay indicated in the offset information, wherein the second TTI corresponds to the TTI index.

Some examples of the method, apparatus, and non-transitory computer-readable medium described above may further include processes, features, means, or instructions for transmitting capability information indicating a number of symbol periods between receipt of the grant by the UE and when the UE may be capable of transmitting uplink data in accordance with the grant, wherein the delay corresponds to the capability information.

In some examples of the method, apparatus, and non-transitory computer-readable medium described above, the delay corresponds to a specified capability information indicating a number of symbol periods between receipt of the grant by the UE and when the UE may be capable of transmitting uplink data in accordance with the grant.

Some examples of the method, apparatus, and non-transitory computer-readable medium described above may further include processes, features, means, or instructions for receiving downlink control information of the first TTI that includes the offset information, wherein the grant indicates resources of a shared data channel allocated to the UE for transmission of uplink data, and wherein the offset information may be a bit flag indicating whether the UE may be to use a first value for the TTI offset indicated in the downlink control information or a second semi-statically configured value for the TTI offset.

Some examples of the method, apparatus, and non-transitory computer-readable medium described above may further include processes, features, means, or instructions for receiving downlink control information of the first TTI that includes the offset information, wherein the grant indicates resources of a shared data channel allocated to the UE for transmission of uplink data, and wherein the offset information comprises a bit sequence corresponding to a number of TTIs occurring between receipt of the grant by the UE and when the UE may be instructed to transmit uplink data in accordance with the grant.

Some examples of the method, apparatus, and non-transitory computer-readable medium described above may further include processes, features, means, or instructions for receiving downlink control information of the first TTI that includes the offset information, wherein the grant indicates resources of a shared data channel allocated to the UE for transmission of uplink data, and wherein the offset information comprises a bit flag indicating whether the UE may be to use a first value for the TTI offset indicated in the downlink control information or a second value for the TTI offset.

Some examples of the method, apparatus, and non-transitory computer-readable medium described above may further include processes, features, means, or instructions for receiving control signaling semi-statically indicating a defined value, wherein the second value for the TTI offset may be a function of the first value for the TTI offset and the defined value.

In some examples of the method, apparatus, and non-transitory computer-readable medium described above, the first value indicates a gap in TTIs between the grant requesting the uplink data and transmission of the uplink data, and the second TTI may be a TTI occurring prior to a TTI corresponding to the first value.

Some examples of the method, apparatus, and non-transitory computer-readable medium described above may further include processes, features, means, or instructions for receiving downlink control information of the first TTI that includes the offset information, wherein the grant indicates resources of a shared data channel allocated to the UE for reception of downlink data.

In some examples of the method, apparatus, and non-transitory computer-readable medium described above, the offset information may be a bit sequence included within downlink control information of the first TTI, the bit sequence corresponding to a number of TTIs occurring between receipt of the grant by the UE and when the UE may be instructed to transmit uplink data in accordance with the grant.

In some examples of the method, apparatus, and non-transitory computer-readable medium described above, the bit sequence may be configured to jointly trigger transmission of a zero-power channel state information reference signal (CSIRS) from a base station and transmission of the A-SPS from the UE.

In some examples of the method, apparatus, and non-transitory computer-readable medium described above, identifying the second TTI further comprises: identifying the second TTI as being offset from the first TTI by the TTI offset.

In some examples of the method, apparatus, and non-transitory computer-readable medium described above, identifying the second TTI comprises: determining that the TTI offset may be a zero TTI offset, wherein the second TTI and the first TTI may be a same TTI.

In some examples of the method, apparatus, and non-transitory computer-readable medium described above, identifying the offset information further comprises receiving control signaling that semi-statically configures the UE with the offset information.

In some examples of the method, apparatus, and non-transitory computer-readable medium described above, identifying the offset information further comprises: receiving downlink control information of the first TTI that includes the offset information for dynamically configuring the UE with the TTI offset.

In some examples of the method, apparatus, and non-transitory computer-readable medium described above, identifying the offset information further comprises retrieving the offset information from memory, wherein the UE may be preconfigured with the offset information.

In some examples of the method, apparatus, and non-transitory computer-readable medium described above, the SRS resource corresponds to a subset of symbol periods within the second TTI.

A method of wireless communication is described. The method may include detecting, within a first TTI, a grant triggering the UE to transmit an A-SRS, identifying a second TTI based at least in part on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI, and transmitting the A-SRS in the SRS resource of the second TTI.

An apparatus for wireless communication is described. The apparatus may include means for detecting, within a first TTI, a grant triggering the UE to transmit an A-SRS, means for identifying a second TTI based at least in part on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI, and means for transmitting the A-SRS in the SRS resource of the second TTI.

Another apparatus for wireless communication is described. The apparatus may include a processor, memory in electronic communication with the processor, and instructions stored in the memory. The instructions may be operable to cause the processor to detect, within a first TTI, a grant triggering the UE to transmit an A-SRS, identify a second TTI based at least in part on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI, and transmit the A-SRS in the SRS resource of the second TTI.

A non-transitory computer-readable medium for wireless communication is described. The non-transitory computer-readable medium may include instructions operable to cause a processor to detect, within a first TTI, a grant triggering the UE to transmit an A-SRS, identify a second TTI based at least in part on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI, and transmit the A-SRS in the SRS resource of the second TTI.

In some examples of the method, apparatus, and non-transitory computer-readable medium described above, receiving configuration information that configures the UE to transmit the A-SRS within at least one symbol index of a plurality of different symbol indexes of a TTI, wherein transmitting the A-SRS in the SRS resource of the second TTI further comprises: transmitting the A-SRS within at least one symbol period of the second TTI corresponding to the at least one symbol index.

Some examples of the method, apparatus, and non-transitory computer-readable medium described above may further include processes, features, means, or instructions for transmitting capability information indicating the first number of symbol periods.

In some examples of the method, apparatus, and non-transitory computer-readable medium described above, the grant indicates resources of a shared data channel allocated to the UE for reception of downlink data.

In some examples of the method, apparatus, and non-transitory computer-readable medium described above, identifying the second TTI further comprises: identifying the second TTI based at least in part on a second number of symbol periods between receipt of the grant by the UE and when the UE may be capable of receiving downlink data.

In some examples of the method, apparatus, and non-transitory computer-readable medium described above, identifying the second TTI further comprises: determining a maximum of the first number of symbol periods and the second number of symbol periods.

In some examples of the method, apparatus, and non-transitory computer-readable medium described above, receiving configuration information that configures the UE to transmit the A-SRS within at least one symbol index of a plurality of different symbol indexes of a TTI, wherein transmitting the A-SRS in the SRS resource of the second TTI further comprises: transmitting the A-SRS within at least one symbol period of the second TTI corresponding to the at least one symbol index, wherein a number of symbol periods between the at least one symbol period of the second TTI and the control channel of the first TTI meets or exceeds the maximum.

Some examples of the method, apparatus, and non-transitory computer-readable medium described above may further include processes, features, means, or instructions for transmitting capability information indicating the first number of symbol periods and the second number of symbol periods.

In some examples of the method, apparatus, and non-transitory computer-readable medium described above, the first number of symbol periods and the second number of symbol periods may be a specified capability of the UE.

In some examples of the method, apparatus, and non-transitory computer-readable medium described above, identifying the second TTI comprises: determining that the second TTI and the first TTI may be a same TTI.

In some examples of the method, apparatus, and non-transitory computer-readable medium described above, identifying the second TTI comprises: identifying the second TTI based at least in part on a maximum of a channel state information reference signal (CSIRS) gap and a UE capability delay.

Some examples of the method, apparatus, and non-transitory computer-readable medium described above may further include processes, features, means, or instructions for processing a use-case indication that indicates whether the A-SRS may be associated with a channel state information reference signal (CSIRS).

A method of wireless communication is described. The method may include transmitting, within a first transmission time interval (TTI), a grant triggering a UE to transmit an A-SRS, identifying offset information indicating a TTI offset relative to the grant, determining a second TTI for the A-SRS based at least in part on the TTI offset, and monitoring an SRS resource of the second TTI for the A-SRS.

An apparatus for wireless communication is described. The apparatus may include means for transmitting, within a first TTI, a grant triggering a UE to transmit an A-SRS, means for identifying offset information indicating a TTI offset relative to the grant, means for determining a second TTI for the A-SRS based at least in part on the TTI offset, and means for monitoring an SRS resource of the second TTI for the A-SRS.

Another apparatus for wireless communication is described. The apparatus may include a processor, memory in electronic communication with the processor, and instructions stored in the memory. The instructions may be operable to cause the processor to transmit, within a first TTI, a grant triggering a UE to transmit an A-SRS, identify offset information indicating a TTI offset relative to the grant, determine a second TTI for the A-SRS based at least in part on the TTI offset, and monitor an SRS resource of the second TTI for the A-SRS.

A non-transitory computer-readable medium for wireless communication is described. The non-transitory computer-readable medium may include instructions operable to cause a processor to transmit, within a first TTI, a grant triggering a UE to transmit an A-SRS, identify offset information indicating a TTI offset relative to the grant, determine a second TTI for the A-SRS based at least in part on the TTI offset, and monitor an SRS resource of the second TTI for the A-SRS.

In some examples of the method, apparatus, and non-transitory computer-readable medium described above, transmitting configuration information to configure the UE to transmit the A-SRS within at least one symbol index of a plurality of different symbol indexes of a TTI, wherein monitoring the SRS resource of the second TTI for the A-SRS further comprises: monitoring at least one symbol period of the second TTI corresponding to the at least one symbol index for the A-SRS.

Some examples of the method, apparatus, and non-transitory computer-readable medium described above may further include processes, features, means, or instructions for transmitting, within the first TTI, downlink control information that includes the offset information, wherein the offset information indicates a delay corresponding to a number of TTIs occurring between receipt of the grant by the UE and when the UE may be instructed to transmit uplink data in accordance with the grant.

In some examples of the method, apparatus, and non-transitory computer-readable medium described above, the offset information corresponds to a TTI index following the delay, and wherein the second TTI corresponds to the TTI index.

Some examples of the method, apparatus, and non-transitory computer-readable medium described above may further include processes, features, means, or instructions for receiving capability information indicating a number of symbol periods between receipt of the grant by the UE and when the UE may be capable of transmitting uplink data in accordance with the grant, wherein the delay corresponds to the capability information.

In some examples of the method, apparatus, and non-transitory computer-readable medium described above, the delay corresponds to a specified capability information indicating a number of symbol periods between receipt of the grant by the UE and when the UE may be capable of transmitting uplink data in accordance with the grant.

Some examples of the method, apparatus, and non-transitory computer-readable medium described above may further include processes, features, means, or instructions for transmitting downlink control information in the first TTI that includes the offset information, wherein the grant indicates resources of a shared data channel allocated to the UE for transmission of uplink data, and wherein the offset information comprises a bit flag indicating whether the UE may be to use a first value for the TTI offset indicated in the downlink control information or a second semi-statically configured value for the TTI offset.

Some examples of the method, apparatus, and non-transitory computer-readable medium described above may further include processes, features, means, or instructions for transmitting downlink control information in the first TTI that includes the offset information, wherein the grant indicates resources of a shared data channel allocated to the UE for transmission of uplink data, and wherein the offset information comprises a bit sequence indicating that the TTI offset corresponds to a number of TTIs occurring between receipt of the grant by the UE and when the UE may be instructed to transmit uplink data in accordance with the grant.

Some examples of the method, apparatus, and non-transitory computer-readable medium described above may further include processes, features, means, or instructions for transmitting downlink control information in the first TTI that includes the offset information, wherein the grant indicates resources of a shared data channel allocated to the UE for transmission of uplink data, wherein the offset information comprises a bit flag indicating whether the UE may be to use a first value for the TTI offset indicated in the downlink control information or a second value for the TTI offset.

Some examples of the method, apparatus, and non-transitory computer-readable medium described above may further include processes, features, means, or instructions for transmitting control signaling semi-statically indicating a defined value, wherein the second value for the TTI offset may be a function of the first value for the TTI offset and the defined value.

In some examples of the method, apparatus, and non-transitory computer-readable medium described above, the first value indicates a gap in TTIs between the grant requesting the uplink data and transmission of the uplink data, and the second TTI may be a TTI occurring prior to a TTI corresponding to the first value.

Some examples of the method, apparatus, and non-transitory computer-readable medium described above may further include processes, features, means, or instructions for transmitting downlink control information in the first TTI that includes the offset information, wherein the grant indicates resources of a shared data channel allocated to the UE for reception of downlink data.

In some examples of the method, apparatus, and non-transitory computer-readable medium described above, the offset information comprises a bit sequence corresponding to a number of TTIs occurring between receipt of the grant by the UE and when the UE may be instructed to transmit uplink data in accordance with the grant.

In some examples of the method, apparatus, and non-transitory computer-readable medium described above, the bit sequence may be configured to jointly trigger transmission of a zero power CSIRS from the base station and transmission of the A-SPS from a UE.

In some examples of the method, apparatus, and non-transitory computer-readable medium described above, identifying the second TTI further comprises: identifying the second TTI as being offset from the first TTI by the TTI offset.

Some examples of the method, apparatus, and non-transitory computer-readable medium described above may further include processes, features, means, or instructions for receiving the A-SRS within the SRS resource of the second TTI. Some examples of the method, apparatus, and non-transitory computer-readable medium described above may further include processes, features, means, or instructions for generating a channel measurement based at least in part on the received A-SRS. Some examples of the method, apparatus, and non-transitory computer-readable medium described above may further include processes, features, means, or instructions for generating a frequency dependent scheduling decision based at least in part on the channel measurement.

Some examples of the method, apparatus, and non-transitory computer-readable medium described above may further include processes, features, means, or instructions for transmitting control signaling to semi-statically configure the UE with the offset information.

Some examples of the method, apparatus, and non-transitory computer-readable medium described above may further include processes, features, means, or instructions for transmitting downlink control information within the first TTI to dynamically configure the UE with the offset information.

In some examples of the method, apparatus, and non-transitory computer-readable medium described above, the UE may be preconfigured with the TTI offset.

In some examples of the method, apparatus, and non-transitory computer-readable medium described above, the SRS resource corresponds to a subset of symbol periods within the second TTI.

In some examples of the method, apparatus, and non-transitory computer-readable medium described above, identifying the second TTI comprises: determining that the TTI offset may be a zero TTI offset, wherein the second TTI and the first TTI may be a same TTI.

A method of wireless communication is described. The method may include transmitting, within a first TTI, a grant triggering a UE to transmit an A-SRS, identifying a second TTI based at least in part on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI, and monitoring the SRS resource of the second TTI for the A-SRS.

An apparatus for wireless communication is described. The apparatus may include means for transmitting, within a first TTI, a grant triggering a UE to transmit an A-SRS, means for identifying a second TTI based at least in part on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI, and means for monitoring the SRS resource of the second TTI for the A-SRS.

Another apparatus for wireless communication is described. The apparatus may include a processor, memory in electronic communication with the processor, and instructions stored in the memory. The instructions may be operable to cause the processor to transmit, within a first TTI, a grant triggering a UE to transmit an A-SRS, identify a second TTI based at least in part on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI, and monitor the SRS resource of the second TTI for the A-SRS.

A non-transitory computer-readable medium for wireless communication is described. The non-transitory computer-readable medium may include instructions operable to cause a processor to transmit, within a first TTI, a grant triggering a UE to transmit an A-SRS, identify a second TTI based at least in part on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI, and monitor the SRS resource of the second TTI for the A-SRS.

In some examples of the method, apparatus, and non-transitory computer-readable medium described above, transmitting configuration information to configure the UE to transmit the A-SRS within at least one symbol index of a plurality of different symbol indexes of a TTI, wherein monitoring the SRS resource of the second TTI for the A-SRS further comprises: monitoring the A-SRS within at least one symbol period of the second TTI corresponding to the at least one symbol index.

Some examples of the method, apparatus, and non-transitory computer-readable medium described above may further include processes, features, means, or instructions for receiving capability information indicating the first number of symbol periods.

In some examples of the method, apparatus, and non-transitory computer-readable medium described above, the grant indicates resources of a shared data channel allocated to the UE for reception of downlink data.

In some examples of the method, apparatus, and non-transitory computer-readable medium described above, identifying the second TTI further comprises: identifying the second TTI based at least in part on a second number of symbol periods between receipt of the grant by the UE and when the UE may be capable of receiving downlink data.

In some examples of the method, apparatus, and non-transitory computer-readable medium described above, identifying the second TTI further comprises: determining a maximum of the first number of symbol periods and the second number of symbol periods.

In some examples of the method, apparatus, and non-transitory computer-readable medium described above, transmitting configuration information to configure the UE to transmit the A-SRS within at least one symbol index of a plurality of different symbol indexes of a TTI, wherein monitoring the SRS resource of the second TTI for the A-SRS further comprises: monitoring the SRS resource of the second TTI for the A-SRS within at least one symbol period of the second TTI corresponding to the at least one symbol index, wherein a number of symbol periods between the at least one symbol period of the second TTI and the control channel of the first TTI meets or exceeds the maximum.

Some examples of the method, apparatus, and non-transitory computer-readable medium described above may further include processes, features, means, or instructions for receiving capability information indicating the first number of symbol periods and the second number of symbol periods.

In some examples of the method, apparatus, and non-transitory computer-readable medium described above, the first number of symbol periods and the second number of symbol periods respectively correspond to defined capability information of the UE.

Some examples of the method, apparatus, and non-transitory computer-readable medium described above may further include processes, features, means, or instructions for receiving the A-SRS within the SRS resource of the second TTI. Some examples of the method, apparatus, and non-transitory computer-readable medium described above may further include processes, features, means, or instructions for generating a channel measurement based at least in part on the received A-SRS. Some examples of the method, apparatus, and non-transitory computer-readable medium described above may further include processes, features, means, or instructions for generating a frequency dependent scheduling decision based at least in part on the channel measurement.

In some examples of the method, apparatus, and non-transitory computer-readable medium described above, identifying the second TTI comprises: determining that the second TTI and the first TTI may be a same TTI.

DETAILED DESCRIPTION

Figure 1:
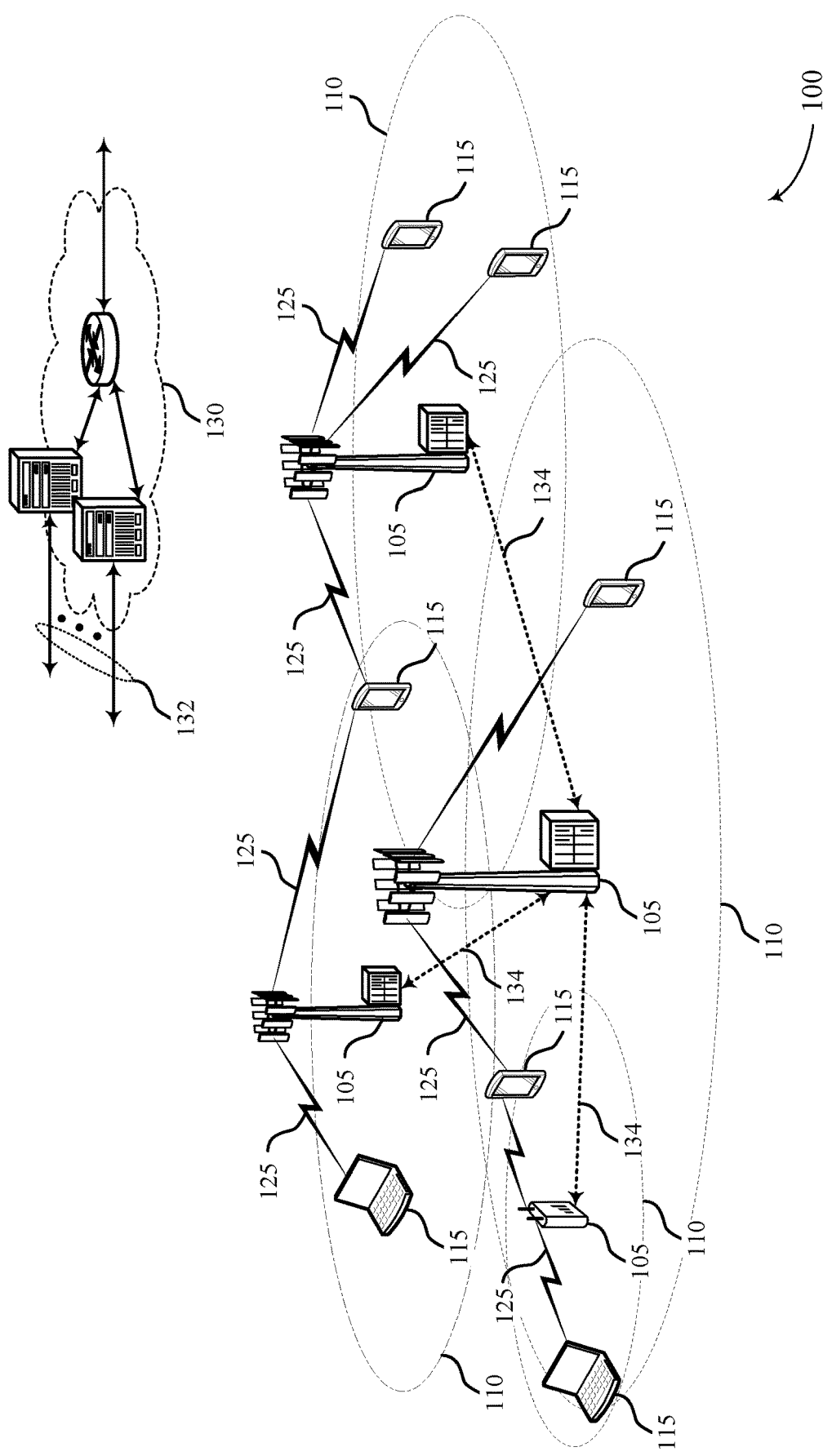
FIG. 1 illustrates an example of a system for wireless communication in accordance with aspects of the present disclosure.

The described techniques relate to improved methods, systems, devices, or apparatuses that support configuration of aperiodic sounding reference signal transmission and triggering. Generally, the described techniques provide for aperiodic triggering of a user equipment (UE) to transmit a sounding reference signal (SRS) in a transmission time interval (TTI) relative to a TTI in which the UE receives a grant of resources. In some examples, a UE may receive a grant that triggers the transmission of an aperiodic SRS, and the UE may identify offset information indicating a TTI offset between the TTI in which the triggering grant is received, and the TTI in which the aperiodic SRS is to be transmitted. In some examples, the TTI in which the aperiodic SRS is to be transmitted may be a function of the amount of time required by the UE to process a grant relative to when the UE is capable of transmitting in accordance with the grant.

In some examples, a UE may receive a downlink signal, such as a DCI transmission, and may transmit sounding reference signals (SRS) to a base station in reply. The DCI may include an uplink grant or a downlink grant, which may trigger the transmission of the SRS by the UE in a TTI that is determined relative to a TTI that includes the grant. A TTI may be a slot, a mini-slot, a frame, a subframe, or any collection of consecutive OFDM symbols, or any other time interval. The UE may send the SRS transmission aperiodically, such as in response to receiving downlink control information (DCI) from the base station. In some cases, the SRS may be transmitted within SRS resource in an earliest available transmission time interval (TTI) relative to when a grant is received, which may be as early as the same TTI that included the grant.

The base station may measure the received SRS to generate a channel estimate of a wireless channel between the base station and the UE, and may use the channel estimate when making frequency dependent scheduling decisions. For example, the base station may continue to schedule the UE in frequency resources in which the UE transmitted the SRS if the channel estimate is satisfactory, and may schedule the UE in different frequency resources if the channel estimate is unsatisfactory.

In some examples, a base station may configure a UE with particular resources within a given TTI on which to transmit aperiodic SRS. The UE may be configured via higher layer signaling (e.g., RRC signaling) or may be preconfigured with SRS resource, which may be one or more adjacent symbol periods located at the end of a TTI (e.g. the final symbol or symbols of a slot). The base station may transmit configuration information that includes one or more symbol indexes for identifying particular symbols periods within a TTI that are SRS resource in which the UE is transmit SRS. The UE may determine, utilizing an aperiodic SRS transmission configuration, in which slot to transmit the SRS on the designated SRS resource.

In some examples, the UE may transmit an SRS in an earliest available TTI relative to when a grant is received. The UE may determine the earliest available slot based at least in part on capability information for the UE. That is, when the UE receives DCI including a downlink grant, the UE may take some minimum amount of time (e.g., a first delay) to process the DCI that triggers the UE to transmit an SRS transmission, prior to transmitting the SRS transmission. In some examples, the UE may be able to process the DCI and transmit the SRS within the same slot in which the DCI is received. In some examples, it may take a UE one or more slots to process the DCI and the UE may transmit the SRS in the SRS resource of the next available slot after processing of the DCI is complete (e.g., the next slot index after the slot index in which the DCI is received). The UE may signal its capability information to its base station, or the base station may know default capability information for UEs operating within its wireless communication system. The base station may generate the DCI, and corresponding grant of resources, in accordance with the signaled or default capability information. The base station may determine, in accordance with the signaled or default capability information, an earliest TTI relative to the grant in which the UE is capable of transmitting SRS, and may monitor SRS resource of that TTI for an SRS transmission from the UE.

In some examples, the UE may transmit an SRS in an earliest available TTI, determined based on the capability information for the UE, after receiving an uplink grant that grants resources for the UE to transmit uplink data. That is, when the UE receives an uplink grant, the UE may take some minimum amount of time to process the uplink grant, prior to being capable of transmitting uplink data in accordance with the grant. In some examples, the base station may know the capability information for the UE and generate an uplink grant in accordance with when the UE is capable of transmitting uplink data relative to when the grant is received. The grant may allocate one or more TTIs to the UE, and the base station may monitor SRS resource of an earliest of the one or more allocated TTIs for an SRS transmission from the UE. In some examples, the earliest available TTI may be the same TTI in which the DCI is received, or may be a subsequent TTI. In some examples, the base station may not know the capability information for a UE. In such examples, the base station may utilize default capability information for determining a TTI when the UE is expected to transmit the SRS relative to when the grant is transmitted, and may monitor SRS resource of that slot for the SRS.

In some examples, the UE may identify a TTI offset relative to when the triggering grant is received for determining in which TTI to transmit the SRS. In some examples, DCI may include a bit flag to indicate whether to use a dynamic TTI offset (e.g., in DCI) or a semi-static offset (e.g., in RRC signaling), and the UE may process the bit flag to determine which offset to use. In some examples, the bit flag may indicate whether to use a dynamic TTI offset (e.g., in DCI) or a second offset that is a function of the dynamic TTI offset. In some examples, the UE may determine that the TTI offset is a zero TTI offset, and hence the SRS transmission may be in the same TTI in which the DCI is received. In some examples, the UE may determine that the TTI offset is one or more TTIs, and the UE may transmit the SRS in a TTI that is offset by one or more TTIs from a TTI that includes the grant.

Aspects of the disclosure are initially described in the context of a wireless communications system. The described techniques provide for aperiodic triggering of a UE to transmit an SRS in a TTI relative to a TTI in which the UE receives a grant of resources. Aspects of the disclosure are further illustrated by and described with reference to apparatus diagrams, system diagrams, and flowcharts that relate to configuration of aperiodic sounding reference signal transmission and triggering.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, a base station 105 may transmit downlink control information (DCI) that includes a downlink grant, or an uplink grant for a UE 115, and in response the UE 115 may transmit an SRS to the base station 105. The timing of when the UE 115 sends the SRS transmission may be relative to a TTI in which the UE 115 receives the DCI, and may be a function of how long it takes the UE 115 to process the DCI before the UE 115 is capable of transmitting in response to the DCI. In some examples, the UE 115 may transmit the SRS on SRS resource in an earliest TTI following a TTI in which the grant is received, which may be as early as the same TTI that included the grant. In some examples, the transmission timing of the SRS may be identified based on TTI offset information. The UE may be preconfigured with the TTI offset information, or the TTI offset information may be received via RRC signaling, or included in DCI. The UE may process the TTI offset information for determining a TTI offset, and may use the TTI offset to determine in which TTI to transmit the SRS relative to the TTI in which the grant is received.

In some cases, a UE 115 may signal its capabilities to the base station 105, or the base station 105 may be aware of default UE capabilities for UEs operating within wireless communications system 100. The base station 105 may determine in which TTI to instruct the UE 115 to transmit uplink data, or to receive downlink data, and generate a grant accordingly. The base station 105 may also identify, based on the signaled UE capabilities or default capabilities, in which TTI the UE 115 is expected to transmit the SRS relative to the grant. The base station 105 may monitor SRS resource of the expected TTI for the SRS. Beneficially, a UE 115 may be configured to transmit an SRS at an earlier or earliest available TTI following the reception of DCI.

Figure 2:
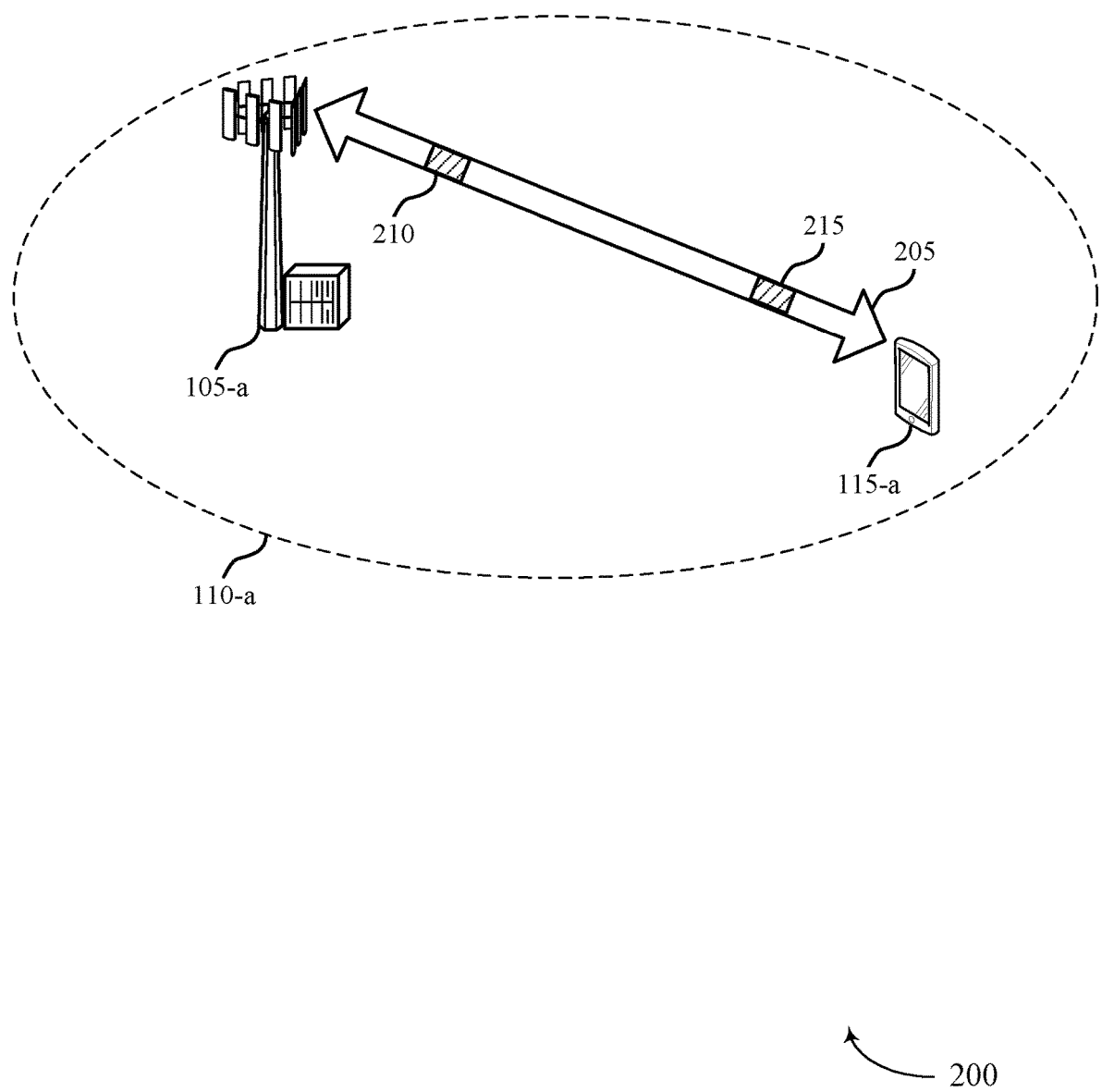
FIG. 2 illustrates an example of a wireless communications system in accordance with aspects of the present disclosure.

FIG. 2 illustrates an example of a wireless communications system 200 in accordance with various aspects of the present disclosure. In some examples, wireless communications system 200 may implement aspects of wireless communications system 100. In some examples, the transmission timing of an aperiodic SRS may be triggered by the reception of an uplink grant or a downlink grant.

In some cases, an aperiodic SRS may be transmitted on SRS resource in an earliest available TTI following a triggering grant. For example, base station 105-a may communicate with various devices within a geographic coverage area 110-a. Base station 105-a may communicate with UE 115-a via bidirectional link 205. Base station 105-a may transmit a downlink signal 210 via bidirectional link 205. In some examples, downlink signal 210 may include DCI. DCI may include a downlink grant or an uplink grant, and additional information regarding the timing of subsequent transmissions. For instance, the DCI included in downlink signal 210 may include TTI offset information (e.g., slot offset information), indicating zero or more TTI subsequent to the reception of downlink signal 210 in which the UE 115-a is to transmit an uplink signal 215 that includes an aperiodic SRS. Base station 105-a may perform channel estimation using the received SRS, and may generate frequency dependent scheduling decisions based on the channel estimation.

An aperiodic SRS transmission configuration may allow a UE to transmit an SRS at a minimum timing, based on the capability information for a UE (e.g., processing capabilities) of UE 115-a. For example, UE 115-a may receive a DCI signal and may be capable of processing the received DCI and transmitting a corresponding SRS within some minimum amount of time. Additionally, an aperiodic SRS transmission configuration may account for the differences in triggering, signaling, and timing constraints based on the capability information for UE 115-a when a DCI includes a downlink grant, as well as when DCI includes an uplink grant. In some cases, the minimum amount of processing time used by UE 115-a may differ based on whether UE 115-a receives a downlink grant or an uplink grant on downlink signal 210. In some examples, determining when to transmit the SRS may vary based on the different minimum processing times.

In some examples, the base station 105-a may configure UE 115-a with particular resources within a given TTI on which to transmit aperiodic SRS. For example, UE 115-a may be configured via higher layer signaling (e.g., RRC signaling) indicate that an SRS resource may be located at the end of a TTI (e.g. the final symbol or symbols of a slot).

In some examples, UE 115-a may transmit an SRS in an earliest available slot after receiving a downlink grant. The earliest available slot may be a function of the capabilities of the UE 115-*a*. That is, when UE 115-*a* receives a downlink grant, UE 115-*a* may take some minimum amount of time (e.g., a first delay including a first number of symbol periods) to process the downlink grant prior to transmitting an SRS. In some examples, the UE may be able to transmit the SRS using SRS resource within the same slot in which the DCI is received, or may take longer to process the DCI and transmit the SRS within SRS resource of a subsequent slot (e.g., the next slot index after the slot index in which the DCI is received). In some examples, UE 115-*a* may transmit capability information, indicating the number of symbol periods between receipt of a grant and when UE 115-*a* is capable of transmitting uplink data in accordance with the grant. Base station 105-*a* may receive the capability information, and may instruct the UE 115-*a* in the DCI to transmit the SRS in the SRS resource of the first slot in which the UE 115-*a* is capable of transmitting the SRS.

In some examples, UE 115-*a* may transmit an SRS in an earliest available slot after a receiving triggering uplink grant, in accordance with the capability information for UE 115-*a*. When UE 115-*a* receives an uplink grant, UE 115-*a* may take some minimum amount of time (e.g., one or more symbol periods) to process the uplink grant, prior to being capable to transmit uplink data and/or an SRS In some examples, UE 115-*a* may transmit capability information to base station 105-*a*, and base station 105-*a* may determine when the UE 115-*a* is capable of transmitting uplink data and/or an SRS relative to when a grant is received. Receipt of the grant may trigger the UE 115-*a* to transmit the SRS in an earliest available slot relative to when the UE 115-*a* receives the grant. The base station 105-*a* may monitor SRS resource of the earliest available slot and receive the SRS transmission in the SRS resource of that slot. The earliest available slot may be the same slot in which the DCI is received, or a subsequent slot.

In some examples, base station 105-*a* may not know the capability information for UE 115-*a*. In such examples, base station 105-*a* may assume specified capability information (e.g., a default capability) for how long it takes for the UE 115-*a* to transmit an SRS relative to when a grant is received. For example, base station 105-*a* may determine a maximum of the delay of how long it takes a UE 115-*a* to process a downlink grant and when the UE 115-*a* is capable of receiving downlink data, and the delay of how long it takes a UE 115-*a* to process an uplink grant and when the UE 115-*a* capable of transmitting uplink data. The base station 105-*a* may determine, based on the specified capability information, a number of zero or more slots between when the UE 115-*a* receives a grant and when the UE is capable of transmitting uplink data in accordance with the grant. The base station 105-*a* may then generate a grant to instruct the UE 115-*a* to transmit uplink data in accordance with the grant based on the determined number of slots. The UE 115-*a* may transmit the SRS in SRS resource of a first of the slots in which the UE 115-*a* is granted resources to transmit uplink data and/or to receive downlink data.

In some examples, UE 115-*a* may identify a slot offset relative to when the triggering grant is received. In some examples, a DCI including an uplink grant may indicate a slot offset between the slot in which the DCI is received, and the slot in which the SRS is to be transmitted. In some examples, the slot offset may be indicated during higher layer signaling (e.g., RRC signaling), or the UE 115-*a* may be preconfigured with the slot offset. UE 115-*a* may utilize the slot offset to determine in which slot to transmit the SRS. For example, UE 115-*a* may determine to transmit the SRS in configured SRS resource in the same slot in which the grant allocates resources to the UE 115-*a* for transmission of uplink data, in a slot occurring one or more slots after a slot in which the grant allocates resources to the UE 115-*a* for transmission of uplink data, or in a slot occurring one or more slots before the slot in which the grant allocates resources to the UE 115-*a* for transmission of uplink data.

In some examples, the DCI including an uplink grant may include a bit sequence. The bit sequence may indicate the timing of uplink transmission and offset information to indicate a slot offset. The bit sequence may include bit flag, or the bit flag may be a bit in addition to the bit sequence. The bit flag having a first value (e.g., bit having a value of zero) may indicate to use a dynamic slot offset indicated in DCI and a second value (e.g., bit having a value of one) to indicate to use a semi-static slot offset configured via RRC signaling. In another example, the bit flag may have a first value (e.g., bit having a value of zero) to indicate to use the dynamic slot offset, and a second value (e.g., bit having a value of one) indicating to use a different slot offset that is a function of the dynamic slot offset (e.g., slot immediately prior to or immediately after slot corresponding to the dynamic slot offset). In some examples, instead of adding a bit flag to the DCI, one of the bits of the bit sequence may be repurposed and used as the bit flag, and fewer bits may be available for indicating the timing of an uplink transmission.

In some examples, some types of DCI conventionally may not include the bit sequence. For example, typically a downlink DCI does not include such a bit sequence for indicating the timing of an uplink transmission. In such examples, DCI may include an additional field with a bit sequence indicating the timing of an uplink transmission, similar to the discussion of uplink DCI, as described above. The bit sequence may also include a bit flag, as described herein.

Figure 3:
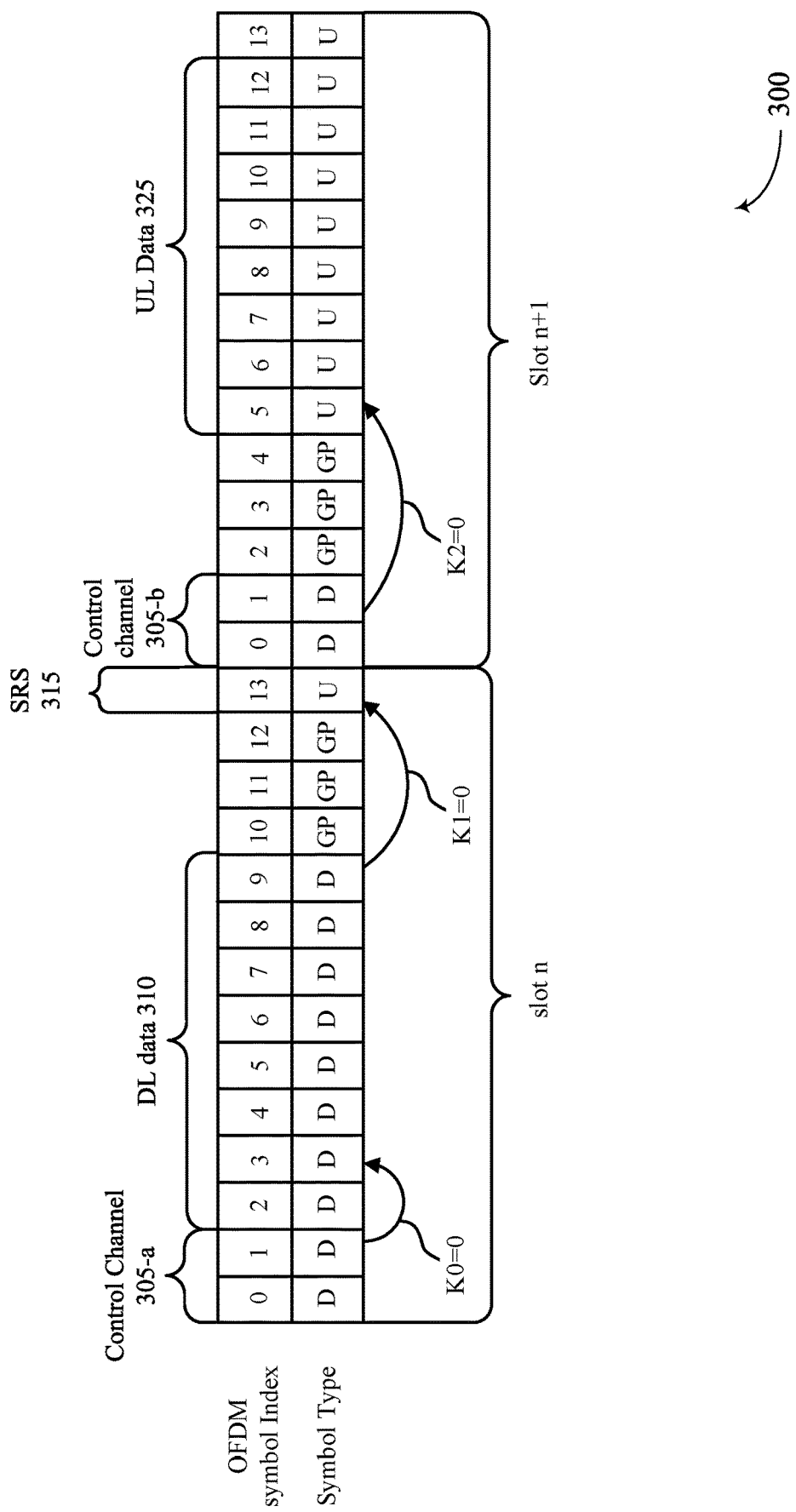
FIG. 3 illustrates an example of a transmission timing in accordance with aspects of the present disclosure.

Some examples of wireless communications system 100 may support SRS transmission timing that is related to HARQ transmission timing and data transmission timing. These transmission timings may be a function of the capabilities of UE 115. FIG. 3 illustrates an example of a transmission timing 300 in accordance with various aspects of the present disclosure. Techniques used in transmission timing 300 may be implemented by a UE 115 and a base station 105, which may be examples of corresponding devices as described with reference to wireless communications systems 100 and 200.

A wireless communications system may support wireless communications, such as new radio (NR) (e.g., 5G). In such a system, a slot may include a control channel 305, such as controls channels 305-*a* and 305-*b* depicted in slot n and slot n+1, and a shared data channel, corresponding to a remaining one or more symbol periods of a particular slot. The depicted slots are examples of TTIs. Control channel 305 may include DCI that includes a grant of resources to the UE 115 and the control channel 305 may be located in a beginning portion of a slot. In an example, a slot may have 14 symbol periods with a slot index ranging from zero to thirteen, and the control channel 305 may be the first one or more symbol periods of the slot (e.g., symbols corresponding to slot index (SI) 0 and SI 1).

UE 115 may support transmission of an SRS on SRS resource 315 of a slot. SRS resource 315 may be located in a last portion of a slot (e.g., SI 13 of slot n) and the SRS resource 315 may span a set of one or more adjacent symbols (e.g., 1, 2, or 4 adjacent symbols). In some examples, SRS resource 315 may correspond to up to 4 ports for every SRS resource. In some cases, all ports of an SRS resource may be sounded in each symbol.

The transmission of SRS may be aperiodic, and may be triggered by reception of DCI in control channel 305, which may carry DCI that includes a downlink grant. In some examples, SRS transmissions may be semi-persistent or periodic, and may be wideband transmissions or subband transmissions. In some cases, SRS bandwidths may be multiples of 4 physical resource blocks (PRB).

In some examples, a wireless communications system (e.g., NR) may support various configurations at the UE 115. For example, the wireless communications system may support switching between partial bands for SRS transmission on a component carrier (CC). Switching may be supported when UE 115 is not capable of simultaneous transmission on partial bands in the CC. In some examples, a partial band may be defined as a bandwidth part. UE 115 may be configured with multiple resources, which may be grouped based on use cases. For example, resource grouping may be different for channel state information (CSI) acquisition, uplink non-codebook precoding, or uplink analog beamforming. In some examples, the wireless communications system may support SRS transmission where numerologies may be configurable for a specific UE or a group of UEs. In some examples, the wireless communications system may support SRS antenna switching within a carrier.

SRS transmissions and other uplink transmissions may be determined based on capability information for a UE 115. That is, capability information for UE 115 may include minimum processing times in terms of symbols together with absolute time (in micro seconds (μs)). For example, UE 115 may utilize a specified number of OFDM symbols (e.g., minimum number of symbols) to process a physical downlink grant. This minimum number of OFDM symbols may be referred to as a first delay, or as $N_0$. $N_0$ may span from the end of a control channel that includes a downlink grant for UE 115 to the beginning of resource of a shared data channel, such as a physical downlink shared channel (PDSCH), allocated to the UE 115 in the downlink grant. In some cases, a UE 115 may utilize a specified number of OFDM symbols (e.g., minimum number) for processing a PDSCH. This specified number of OFDM symbols may be referred to as a second delay, or as $N_1$. $N_1$ may span from the end of control channel 305, which may include a downlink signal, received on a PDSCH to the earliest possible beginning of a corresponding uplink ACK/NACK from the perspective of UE 115.

UE 115 may utilize a specified number of OFDM symbols (e.g., minimum number) for processing a physical downlink control channel. This specified number of OFDM symbols may be referred to as a third delay, or as $N_2$. $N_2$ may span from the end of a PDCCH containing an uplink grant to the earliest possible transmission of uplink data 325 by the UE 115 on a shared data channel, such as a physical uplink shared channel (PUSCH). In some examples, $N_1$ and $N_2$ may or may not include a timing advance (TA). In some examples, a base station 105 may not expect to receive an uplink transmission if a slot offset between receiving a DCI transmission at UE 115 and the transmission of a scheduled uplink transmission does not satisfy capability information for UE 115 (e.g., does not satisfy one or both of $N_0$ and $N_2$).

In some examples, SRS transmissions and other uplink transmissions may be determined based on one or more timing relationships. Timing relationships may be defined by a slot offset. For example, a delay in slots may occur between reception of a DL grant in control channel 305-a and reception of corresponding downlink data 310 on a shared data channel (e.g., a PDSCH data). This delay may be known as slot offset $K_0$. In some examples, a delay in slots may occur between reception downlink data (e.g., PDSCH data) by UE 115 and when the UE 115 transmits a corresponding uplink ACK/NACK. This delay may be known as slot offset $K_1$. A delay may occur between reception of an uplink grant in control channel 305 by UE 115 and when the UE 115 transmits uplink data 325 on a shared data channel (e.g., PUSCH data) in accordance with the grant. This delay may be referred to as slot offset $K_2$. In some examples, a delay in slots may occur between when a base station 105 receives an ACK/NACK signal corresponding to downlink data previously transmitted to UE 115, and retransmits the downlink data corresponding to the ACK/NACK signal. This delay may be referred to as a slot offset $K_3$. Slot offsets as described above may be utilized in cases where, for example, a UE is configured with a single numerology with slot-level scheduling and a single transmit power transmission.

In some examples, indications of one or more slot offsets may be included in a DCI transmission. For example, as described in greater detail with respect to FIG. 5, UE 115 may receive a bit sequence including an indication of slot offset $K_2$. Additionally, or alternatively, UE 115 may be preconfigured or configured via higher layer signaling (RRC signaling) to know a default value of slot offset $K_2$. In some examples, UE 115 may determine which SRS resource to utilize for transmitting an SRS relative to when a grant is received based at least in part on a slot offset (e.g., $K_2$).

In some cases, a wireless communications system may support a minimum value of $K_0$ such that downlink assignments and scheduled uplink or downlink data transmissions may occur within the same slot. For example, UE 115 may receive a downlink grant in control channel 305-a in slot n. If UE 115 has the capability to do so, UE 115 may receive downlink data 310 in one or more symbol periods following the end of control channel 305. In such a case, $K_0$=0, and UE 115 may receive downlink data 310 in the same slot n as control channel 305-a that includes the downlink grant. In some examples, if UE 115 has the capability, UE 115 may receive downlink data 310 and transmit uplink ACK/NACK within the same slot n. In such examples, $K_1$=0. Similarly, if UE 115 has sufficient processing capabilities, UE 115 may receive an uplink grant in control channel 305-b in slot n+1, and may transmit uplink data 325 within the same slot n+1. In such cases, $K_2$=0.

An aperiodic SRS transmission configuration may specify a minimum timing between receiving DCI and transmitting aperiodic SRS. In some cases, the base station 105 may or may not know the capabilities of UE 115, and the aperiodic SRS transmission configuration may be determined accordingly. For example, a UE 115 may have established an RRC connection with base station 105 and initiated wireless communications, but the UE 115 may not yet have advertised its capability information to the base station 105. Furthermore, an aperiodic SRS transmission configuration may be utilized to determine a minimum timing between DCI and SRS transmission when the DCI includes an uplink grant and when the DCI carries a downlink grant.

Figure 4:
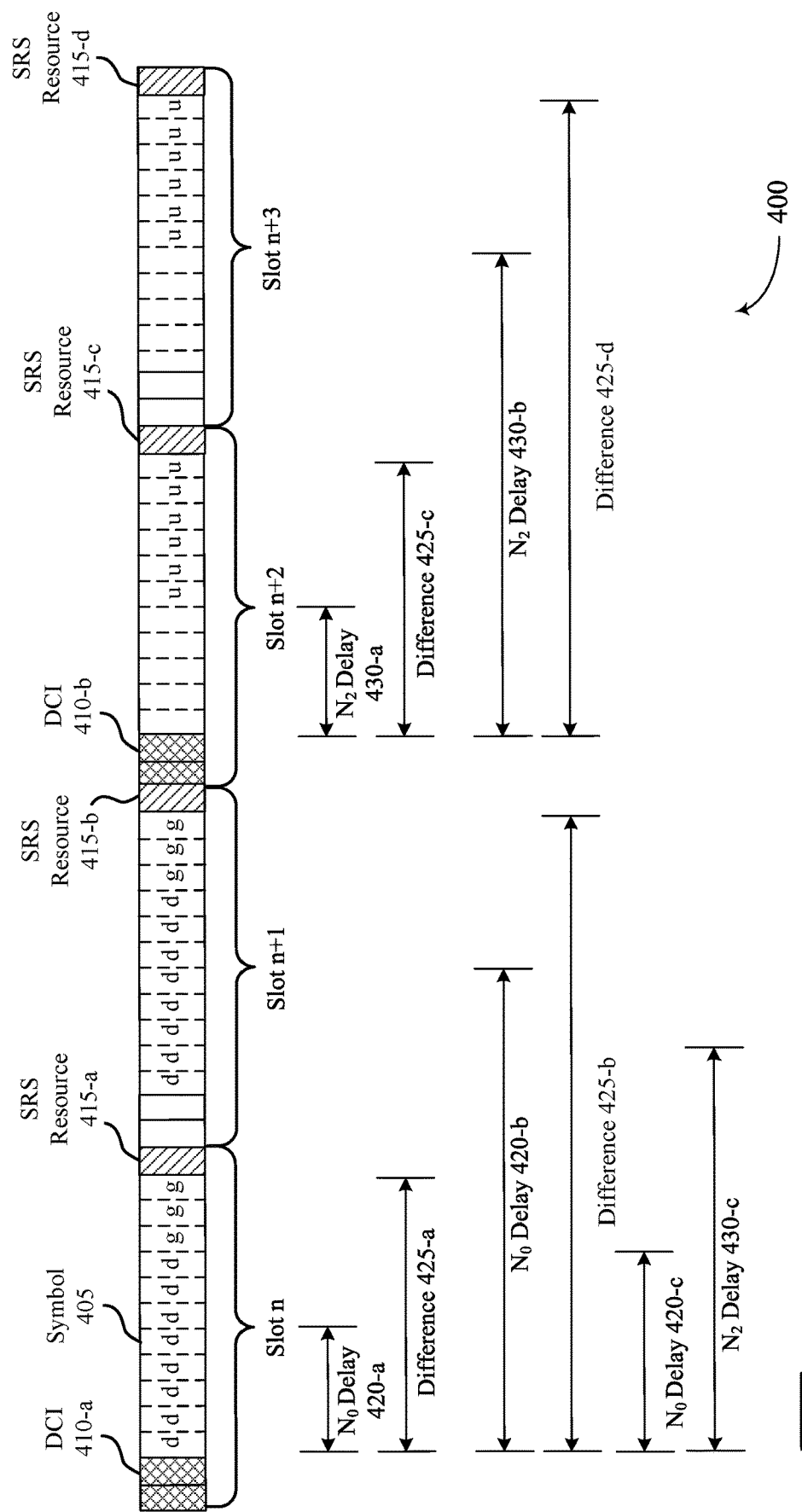
FIG. 4 illustrates an example of a timeline in accordance with aspects of the present disclosure.

In some examples, an SRS transmission may be sent at an earliest available slot relative to a slot that includes a grant, based on the capability information of a UE 115 indicated to a base station 105. FIG. 4 illustrates an example of a timeline 400 in accordance with various aspects of the present disclosure. In some examples, timeline 400 may implement aspects of wireless communications system 100. Techniques used in transmission timeline 400 may be implemented by a UE 115 and a base station 105, which may be examples of corresponding devices as described with reference to wireless communications systems 100 and 200.

Symbols of a slot, such as symbol 405, may be indexed and scheduled across one or more slots (e.g., slot n, slot n+1, slot n+2, etc.). In FIG. 4, 'u' may represent an uplink symbol, 'd' may represent a downlink symbol, and 'g' may represent a guard period. In some examples, base station 105 may configure UE 115 with SRS resource, which may be located at the end of a slot. The SRS resource may be adjacent symbol periods, and may be located in the last symbol or symbols of a slot n. In some examples, SRS resource 415 may span 1 symbol, 2 symbols, or 4 symbols. UE 115 may receive a DCI, and may be expected to transmit the SRS in the SRS resource of the earliest available slot in accordance with the capability information of UE 115. In some cases, base station 105 may transmit configuration information that configures UE 115 to transmit the aperiodic SRS within at least one symbol index of multiple symbol indexes of a slot. The at least one symbol index may correspond to the symbol periods defining the SRS resource 415 within a slot.

In some examples, a DCI 410 may include a grant of resources for UE 115. The base station 105 may allocate resources to the UE 115 in the grant based on the signaled or specified (e.g., default) capability of the UE 115. The UE 115 may be expected to transmit the SRS in the SRS resource of the first available slot relative to slot that includes the grant, given that enough time has passed according to the signaled or default capability of the UE 115.

In an example, the signaled or default capability of the UE 115 may indicate that the UE 115 is capable of processing the DCI 410 in fewer than 14 symbol periods. The UE 115 may detect, within slot n, a grant in the DCI 410 that triggers the UE 115 to transmit an aperiodic SRS. The UE 115 may identify in which slot to transmit the SRS based on a first number of symbol periods between receipt of the grant by the UE 115 and when the UE 115 is capable of transmitting uplink data. The first number of symbol periods corresponds to the $N_0$ delay 420, representing a minimum amount of symbol periods required by the UE 115 to process a downlink grant, in accordance with the signaled or default capability of the UE 115, and receive downlink data in accordance with the downlink grant. In another example, the first number of symbol periods corresponds to $N_2$ delay 430 representing a minimum amount of symbol periods required by the UE 115 to process an uplink grant, in accordance with the signaled or default capability of the UE 115, and transmit in accordance with the uplink grant.

In a first example, the UE 115 may signal its capability information to the base station 105, and the base station 105 may use the capability information when generating DCI 410-a that includes a downlink grant for UE 115. In an example, the base station 105 may process capability information received from the UE 115 for determining the $N_0$ delay 420. In slot n, for example, $N_0$ delay 420-a may be less than difference 425-a. Difference 425-a may represent a number of symbol periods between a first symbol period of SRS resource 415-a, and a last symbol period of a control channel of slot n that includes DCI 410-a. Base station 105 may identify, based on the capability information, that the UE 115 is capable of processing a grant and transmitting uplink data in a same slot (e.g., within slot n). The base station may generate a downlink grant in DCI 410-a that grants resources to the UE 115 in slot n for reception of downlink data. The UE 115 may process the DCI 410, and identify that it is to transmit the SRS in SRS resource 415-a within the same slot that included the downlink grant in the DCI 410-a. Thus, because $N_0$ delay 420-a is less than difference 425-a, slot n is the earliest available slot, and the UE 115 may transmit the SRS in SRS resource 415-a, instead of in a later slot, such as slot n+1. Base station 105 may monitor the SRS resource 415-a for an SRS transmitted by the UE 115.

In another example, the capability information may indicate that $N_0$ delay 420-b is greater than difference 425-a but less than difference 425-b, and hence the UE 115 may identify that it is to transmit the SRS in SRS resource 415-b within the next slot (e.g., slot n+1) which is after the slot that included the downlink grant in the DCI 410-a. Base station 105 may monitor the SRS resource 415-b for an SRS transmitted by the UE 115. The techniques described herein may applied for determining to transmit the SRS in subsequent slots for longer $N_0$ delays.

Slot n+2 corresponds to DCI 410-b that includes an uplink grant for UE 115. The base station 105 may use the capability information received from UE 15 when generating DCI 410-b that includes the uplink grant for UE 115. In an example, the base station 105 may process capability information received from the UE 115 for determining the $N_2$ delay 430-a. Base station 105 may identify, based on the capability information, that the UE 115 is capable of processing a grant and transmitting uplink data in a same slot. In slot n+2, for example, $N_2$ delay 430-a may be less than difference 425-c (e.g., between last symbol period of control channel that includes DCI 410-b and a first symbol period of SRS resource 415-c), and hence the UE 115 may identify that it is to transmit the SRS in SRS resource 415-c within the same slot that included the uplink grant in the DCI 410-b. Thus, slot n+2 is the earliest available slot, and the UE 115 transmits the SRS in SRS resource 415-c, instead of in a later slot, such as slot n+3. Base station 105 may monitor the SRS resource 415-c for an SRS transmitted by the UE 115.

In another example, $N_2$ delay 430-b may be greater than difference 425-c but less than difference 425-d, and hence the UE 115 may identify that it is to transmit the SRS in SRS resource 415-d within the next slot (e.g., slot n+3) which is after slot n+2 that included the uplink grant in the DCI 410-b. Base station 105 may monitor the SRS resource 415-d for an SRS transmitted by the UE 115. The techniques described herein may applied for determining to transmit the SRS in subsequent slots for longer $N_2$ delays.

In some examples, the UE 115 may not yet have signaled its capability information to the base station 105, and the base station 105 may use specified (e.g., default) capability information when generating DCI 410 that includes a downlink grant for UE 115. In FIG. 4, for example, $N_0$ delay 420-c may represent a default $N_0$ delay and $N_2$ delay 430-c may represent a default $N_2$ delay. The UE 115 is expected to transmit the SRS in the SRS resource of the first available slot corresponding to the grant, given that enough time has passed according to a maximum of the default capability (e.g., maximum of $N_0$ delay and $N_2$ delay). In the depicted example, the larger delay is the $N_2$ delay 430-c. In slot n, for example, $N_2$ delay 430-c may be larger than difference 425-a and smaller than difference 425-b. Base station 105 may identify, based on the default capability information, that the UE 115 is capable of processing a grant and transmitting uplink data in the next slot (e.g., slot n+1) after the slot that includes DCI 410-a with the downlink grant. The UE 115 may identify that it is to transmit the SRS in SRS resource 415-b within the next slot (e.g., slot n+1) which is after the slot that included the downlink grant in the DCI 410-a. Base station 105 may monitor the SRS resource 415-b for an SRS transmitted by the UE 115. The techniques described herein may applied for determining to transmit the SRS in subsequent slots where a maximum of default capability is longer.

In some examples, triggering in which TTI the UE 115 transmits may be associated with a channel state information (CSI) reference signal (RS) and a CSIRS gap. In some cases, a specified (e.g., minimum) time interval, (e.g., N in unit of symbols) may occur between DCI triggering and A-SRS transmission, and may have a candidate value range that is the same as $N_2$. In some examples, there may be a minimum time interval (e.g., 42 symbols) between reception of an aperiodic channel state information reference signal (A-CSIRS) and when the UE 115 is expected to update its A-SRS precoding. This minimum time interval may be referred to as a CSIRS gap. Prior to the CSIRS gap elapsing, the UE 115 is not expected to have updated its A-SRS precoding.

Triggering transmission of an SRS may take into account the minimum time interval (e.g., CSIRS gap) between when the associated CSIRS is transmitted and when transmission of the SRS occurs relative to a grant. In some examples, UE 115 and base station 105 may identify whether the SRS is associated with a CSIRS. When determining the earliest available slot to transmit SRS, the earliest available slot may be determined based on the CSIRS gap (e.g., the minimum time interval) and a UE capability delay (e.g., the No and/or $N_2$ delay). For downlink transmission, the UE 115 and base station 105 may identify a maximum of the CSIRS gap and the UE capability delay (e.g., $N_0$ delay). The maximum may be the longer of the two in time or number of symbols. The maximum of the CSIRS gap and the UE capability delay may be used by the UE 115 and base station 105 for determining the earliest available slot (e.g., earliest available TTI) in which the SRS is to be communicated relative to the slot that includes the downlink grant, similar to the above discussion of determining in which SRS resource 415 the SRS is to be transmitted based on the $N_0$ delay. For uplink transmission, the UE 115 and base station 105 may identify a maximum of the CSIRS gap and the UE capability delay (e.g., the $N_2$ delay). The maximum of the CSIRS gap and the UE capability delay may be used by the UE 115 and base station 105 for determining the earliest available slot (e.g., earliest available TTI) in which the SRS is to be communicated relative to the slot that includes the uplink grant, similar to the above discussion of determining in which SRS resource 415 the SRS is to be transmitted based on the $N_2$ delay. In an example, a maximum between 42 symbols and an earliest available slot (e.g., earliest possible TTI) may be determined such that the UE capability (e.g., No and/or $N_2$) is satisfied.

In some instances, an aperiodic SRS resource associated with a CSIRS may be an SRS resource corresponding to an uplink non-codebook precoding use-case, and may correspond to a use-case or use-case indication that follows (e.g., is equal to) uplink non-codebook precoding. DCI, for example, may include a use-case indication having a first value to indicate that the SRS resource is associated with a CSIRS, and a second value to indicate that the SRS resource is not associated with a CSIRS. The use-case indication may trigger whether the UE 115 is to use the maximum of the CSIRS delay and the $N_0$ delay and/or the $N_2$ delay, or the $N_0$ delay or the $N_2$ delay when determining in which TTI (e.g., slot) to transmit the SRS relative to a TTI that included the grant.

Figure 5:
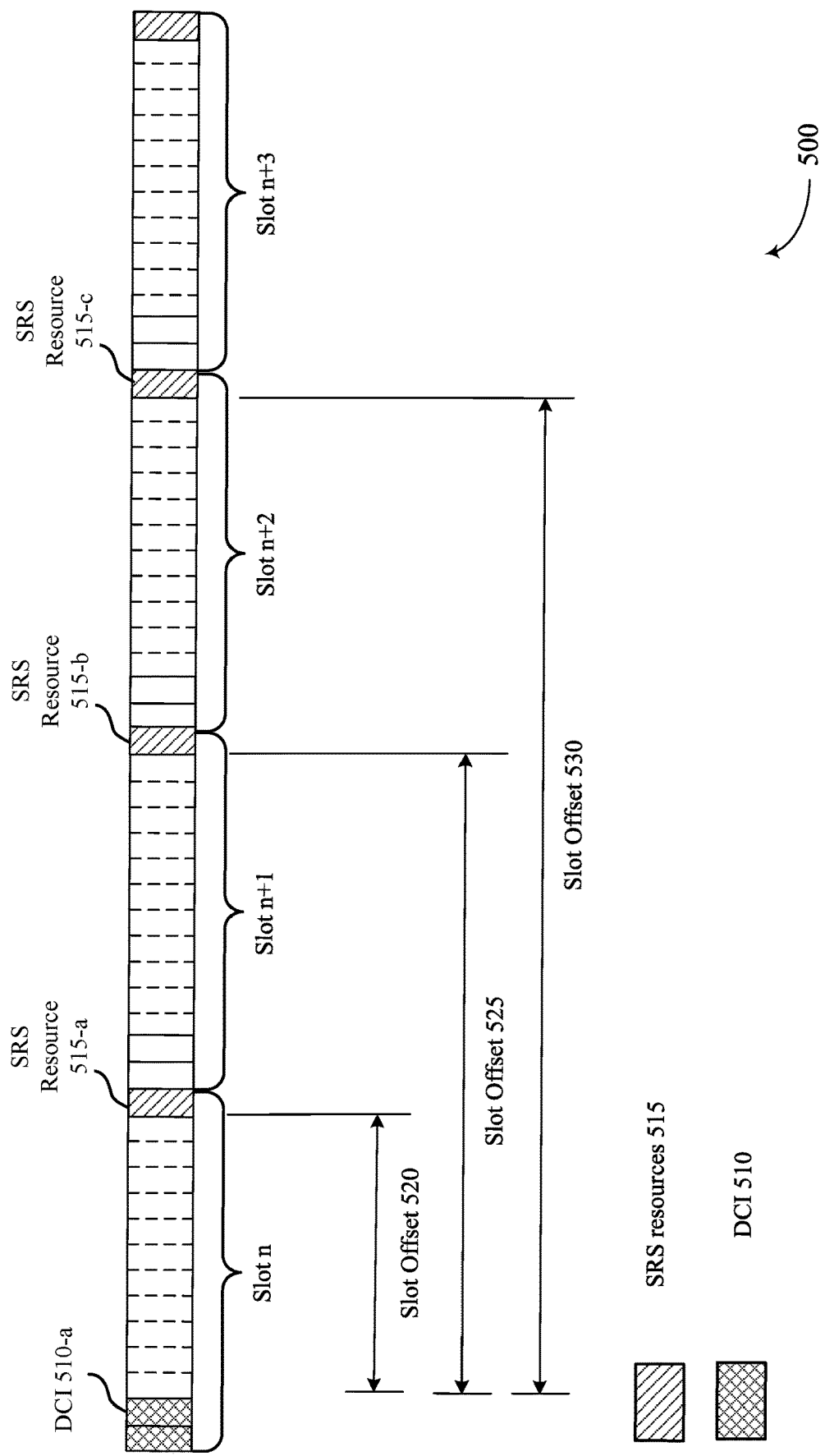
FIG. 5 illustrates an example of a timeline in accordance with aspects of the present disclosure.

A transmission timing of an SRS relative to a grant received in DCI may be determined based on slot offset information. The slot offset information may be received in DCI, via RRC signaling, or may preconfigured at UE 115 and base station 105. FIG. 5 illustrates an example of a timeline 500 in accordance with various aspects of the present disclosure. In some examples, timeline 500 may implement aspects of wireless communications system 100. Techniques used in timeline 500 may be implemented by a UE 115 and a base station 105, which may be examples of corresponding devices as described with reference to wireless communications systems 100 and 200.

The transmission timing of the SRS relative to a grant may be based on slot offset information. In some examples, base station 105 may transmit configuration information that configures UE 115 with an SRS resource 515 of a TTI. A TTI (e.g., slot) may be composed of a set of symbol periods and a set of symbol indexes may correspond to a respective symbol period in the set of symbol periods. The configuration information may identify, for example, a set of one or more symbol indexes to identify the SRS resource 515 within a slot. In FIG. 5, slot n may include 14 symbols and the configuration information may indicate that a symbol index corresponding to a last symbol period of the slot is to be used as the SRS resource 515. The configuration information may identify more than one symbol index, and hence the SRS resource 515 may be more than one symbol period of a slot.

The timing of an SRS transmission relative to a grant may depend at least in part on whether the capability information for UE 115 is known at base station 105. For example, if base station 105 knows the capability information of UE 115 (e.g., the amount of time or number of symbols utilized by UE 115 to process DCI 510), base station 105 may communicate slot offset information via RRC signaling or in DCI. The slot offset information may indicate information for identifying a slot offset (e.g., slot offset 525). The slot offset information may permit the UE 115 to determine in which slot to transmit SRS relative to a slot that includes DCI 510 having a grant of resources for the UE 115.

In some examples, the base station 105 may configure the UE 115 with the slot offset information via RRC signaling. The slot offset information may indicate a slot offset, and the UE 115 may use the slot offset for determining in which slot to transmit an SRS relative a slot that includes a grant for the UE 115. The slot offset information may indicate a slot offset of zero or more slots. For example, slot offset 520 may correspond to a zero slot offset 520, a single slot offset 525, and or a multi-slot offset 530 (e.g., a two slot offset). A slot offset configured via RRC signaling may be referred to as a semi-static slot offset. If, for example, DCI 510-a includes a grant of resources to the UE 115, the UE 115 may identify the semi-static slot offset. For a zero slot offset, the UE 115 may transmit the SRS in SRS resource 515-a (e.g., in the same slot that included the grant). For a single slot offset, the UE 115 may transmit the SRS in SRS resource 515-b (e.g., in the next slot after the slot that included the grant). For a two slot offset, the UE 115 may transmit the SRS in SRS resource 515-c (e.g., in two slots after the slot that included the grant). The base station 105 that transmitted DCI 510-a knows the semi-static slot offset, and monitor for an SRS transmission in the SRS resource 515 corresponding to the semi-static slot offset. The techniques may be extended to a semi-static slot offset having any number slot offset.

In some examples, the base station 105 may configure the UE 115 with the slot offset information in DCI. Similar to the discussion provided above, the slot offset information in DCI may indicate in which slot the UE 115 is to transmit an SRS relative a slot that includes a grant for the UE 115. In an example, the DCI 510 may include a grant of uplink resources and offset information indicating a slot index. The slot index may identify a slot in which the UE 115 is to transmit uplink data (e.g., slot index may follow a K2 value reported in DCI 510). The UE 115 may transmit the SRS in the SRS resource 515 of the slot corresponding to the same slot index indicated in DCI 510. In an example, if DCI 510-*a* includes a grant of resources to the UE 115, the offset information may include a slot index for a zero slot offset (e.g., in the same slot that included the grant), a one slot offset (e.g., in slot n+1 that is one slot after slot n that included the grant), or a two slot offset (e.g., in slot n+2 that is two slots after slot n that included the grant). The slot index may indicate additional offsets. As the UE 115 is configured with the location of the SRS resource 515 in each slot, the UE 115 may transmit the SRS in the slot corresponding to the slot index indicated in DCI 510-*a* (e.g., in one of SRS resource 515-*a*, 515-*b*, or 515-*c*). Similarly, the base station 105 that transmitted DCI 510-*a* knows the offset information included in DCI 510-*a*, and monitor for an SRS transmission in the SRS resource 515 corresponding to the offset information indicated in DCI 510-*a*.

For DCI 510-*a* that includes a grant of resources to the UE 115 for transmission of uplink data, the offset information in DCI 510-*a* may be a bit sequence to indicate uplink timing. In some examples, the bit sequence may include three bits to indicate a $K_2$ offset relative to the slot that included the grant (e.g., a $K_2$ offset to indicate PUSCH timing). The UE 115 may transmit the SRS in the SRS resource 515 of the same slot indicated in the $K_2$ offset. For example, the base station 105 may set the $K_2$ offset in DCI 510-*a* as $K_2$=1, to instruct the UE 115 to transmit uplink data in the next slot (e.g., slot n+1). The UE 115 may process the DCI 510-*a* in slot n to identify the $K_2$ offset, and transmit the SRS in SRS resource 515-*b* of slot n+1. In some examples, the UE 115 may transmit the SRS in the SRS resource 515 of slot occurring after the slot indicated in the $K_2$ offset.

In some examples, one of the bits in the bit sequence of DCI 510-*a* may be a bit flag, or the bit flag may be an additional bit that is in addition to the bit sequence. In some examples, instead of adding an addition 1-bit flag to a 3-bit sequence, the 3-bit sequence may be reduced to a 2-bit sequence (e.g., signal $K_2$ offset using the two bits), and the third bit may be repurposed as the above described 1-bit flag.

In some cases, the base station 105 may toggle the bit flag to indicate which slot offset of multiple slot offsets to use. In an example, the base station 105 may toggle the bit flag in DCI 510-*a* to indicate whether the UE 115 is to use a dynamic slot offset or a semi-static offset. If the UE 115 is to use a dynamic slot offset, the bit flag may have a first value (e.g., bit value of zero) indicating that the UE 115 is to use offset information included in DCI 510-*a* for identifying the dynamic slot offset. If the UE 115 is to use a semi-static slot offset, the bit flag may have a second value (e.g., bit value of one) indicating that the UE 115 is to use the semi-static slot offset received via RRC signaling. In an example, the dynamic slot offset be that the UE 115 is to transmit SRS in SRS resource of the same slot that includes a grant of resources for UE 115, and the semi-static slot offset may be that the UE 115 is to transmit SRS in SRS resource of a slot occurring two slots after a slot is received that includes a grant of resources for UE 115. In FIG. 5, for example, bit flag having a first value may instruct the UE 115 to transmit SRS in SRS resource 515-*a* (e.g., transmit SRS in the slot n that also includes the grant in DCI 510-*a*), and bit flag having a second value may instruct the UE 115 to transmit SRS in SRS resource 515-*c* (e.g., transmit SRS in slot n+2 occurring two slots after slot n that includes the grant in DCI 510-*a*).

The base station 105 may toggle the bit flag to indicate whether to use a dynamic slot offset or a second offset that is a function of the dynamic slot offset. For example, the bit flag having a first value (e.g., bit value of zero) for a TTI offset may be offset $K_2$ indicated in DCI 510-*a*, and the bit flag having a second value (e.g., bit value of zero) for the TTI offset may be offset $K_2$ plus a constant offset c. In some cases, c may be a constant value from a set of integer values (e.g., −1 and 1). The value of c may be RRC configured, or may be configured by a media access control (MAC) control element (CE) transmitted by the base station 105 to the UE 115. In some examples, the first value may indicate a gap in TTIs between the grant requesting the uplink data and transmission of the uplink data (e.g., indicate offset $K_2$), and the constant value c may be used to cause the UE 115 to transmit the SRS prior to or after the TTI in which the UE transmits uplink data (e.g., prior to or after TTI corresponding to offset $K_2$. In some such examples, for slot offset $K_2$ is equal to slot offset 525 (e.g., to indicate slot n+1), then the 1 bit flag may indicate whether UE 115 should transmit the SRS at slot offset 520 in slot n (e.g., $K_2$−1) or at slot offset 530 in slot n+2 (e.g., $K_2$+1). The base station 105 may use the bit flag in DCI 510-*a* to control whether the UE 115 transmits SRS prior to, in the same, or in a subsequent slot, relative to the slot granting the UE 115 resources for transmitting uplink data (e.g., before or after slot corresponding to the slot indicated in the offset $K_2$).

Unlike an uplink grant, a downlink grant in DCI does not conventionally include bits for indicating PUSCH timing (e.g., offset $K_2$). To remedy this deficiency, in accordance with the examples described herein, the slot offset information may be communicated via RRC signaling. When the DCI 510-*a* includes a grant of downlink resources for the UE 115, the UE 115 may determine a slot offset using slot offset information configured via RRC signaling (e.g., identify a semi-static slot offset), and determine which slot to use for transmitting the SRS relative to the slot that includes the grant. In an example, the semi-static slot offset may be that the UE 115 is to transmit SRS in SRS resource of a slot occurring in the next slot after a slot is received that includes a grant of resources for UE 115. In FIG. 5, for example, the UE 115 may transmit SRS in SRS resource 515-*b* (e.g., transmit SRS in slot n+1 that is one slot after the slot that the grant in DCI 510-*a*). RRC signaling may be used to configure slot offset information corresponding to a semi-static slot offset that is one or more slots after the slot that includes the grant.

In some examples, DCI 510 that includes a downlink grant be configured to include a bit sequence similar to the bit sequence indicating the $K_2$ offset for PUSCH timing as described with respect to DCI that includes an uplink grant. The bit sequence may include, for example, up to 3 bits. One of the 3 bits may be configured as a 1-bit flag as described herein for toggling between a dynamic slot offset and a semi-static offset, or for toggling between a dynamic slot offset and a dynamic slot offset plus or minus a constant value.

In some examples, the DCI 510 may be a bit sequence that is a joint field for indicating transmission of a reference signal and for triggering the UE 115 to transmit SRS. For instance, DCI 510 may include a field for jointly indicating that the base station 105 is transmitting a zero power channel state information reference signal (ZP-CSIRS) and for triggering the UE 115 to transmit SRS. The bit sequence may include a set of bits (e.g., 1 to 3 bits) to indicate that the base station 105 is transmitting ZP-CSIRS, and for indicating offset information for identifying a slot offset. The UE 115 may process the bit sequence to determine that it is to monitor for the ZP-CSIRS transmitted by base station 105, and to transmit an SRS in a slot relative to a slot that includes the DCI 510. The UE 115 may determine in which slot to transmit the SRS in accordance with the techniques described herein.

Figure 6:
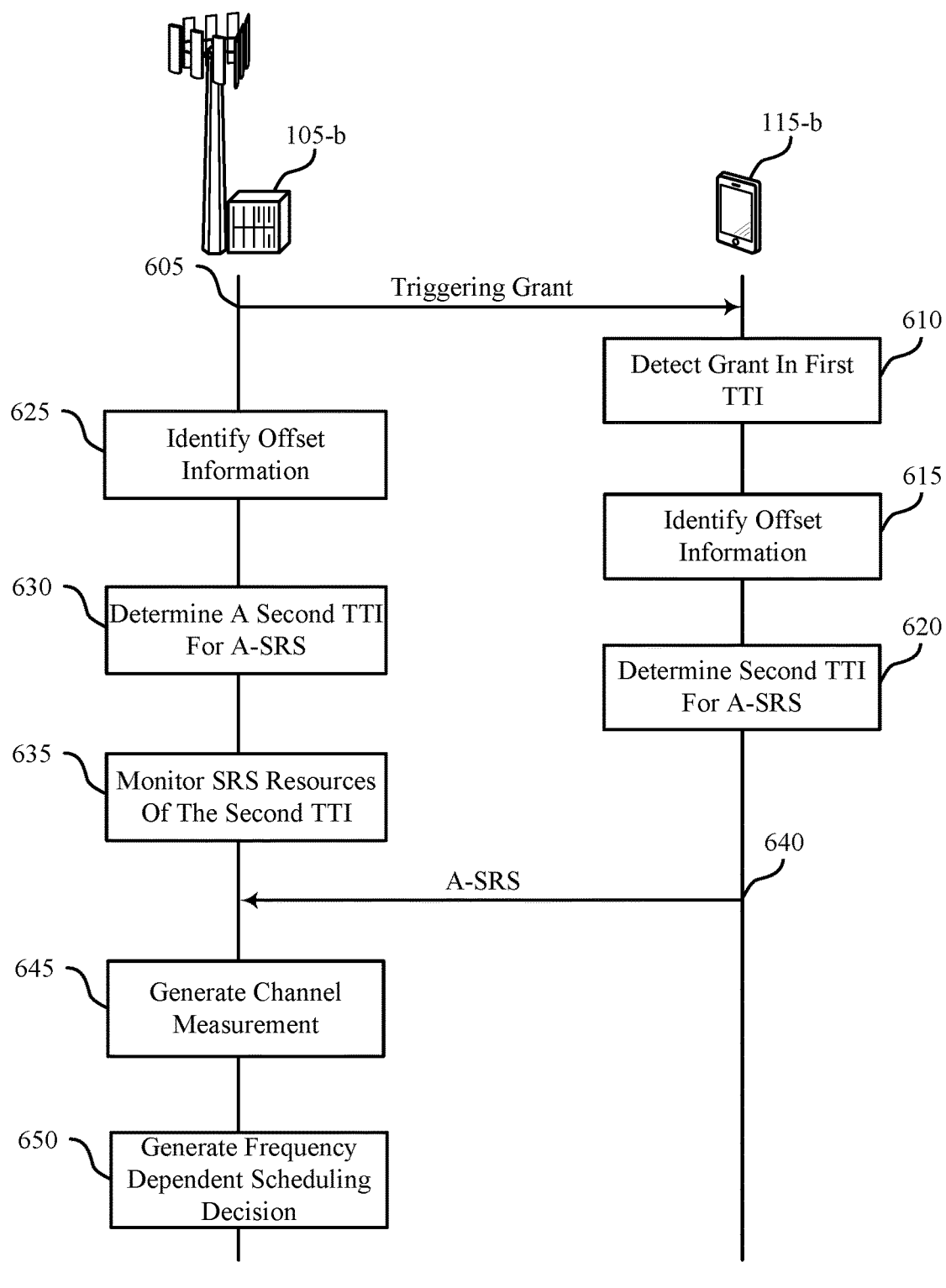
FIG. 6 illustrates an example of a process flow that supports reference signal transmission and triggering in accordance with aspects of the present disclosure.

FIG. 6 illustrates an example of a process flow 600 in accordance with various aspects of the present disclosure. In some examples, process flow 600 may implement aspects of wireless communications system 100. Techniques used in process flow 600 may be implemented by a UE 115-b and a base station 105-b, which may be examples of corresponding devices as described with reference to wireless communications systems 100 and 200.

At 605, base station 105-b transmits a triggering grant to UE 115-b. The triggering grant may be an uplink grant or a downlink grant. The triggering grant may be included in a DCI transmission. At 610, UE 115-b detects the triggering grant in a first TTI. The grant may trigger the UE to transmit an aperiodic SRS.

At 615, UE 115-b identifies offset information indicating a TTI offset relative to the grant received at 605. The offset information may be a TTI offset that is preconfigured at UE 115-b, may be indicated via RRC signaling, or may be included in the same DCI transmission in which the triggering grant of 605 is received. In some cases, the offset information may be based on an uplink grant, and the time between the grant of 605 and the corresponding scheduled uplink transmission (e.g., $K_2$). In some cases, the offset information may be based on $K_2$ and some additional value (e.g., −1 or 1) indicating that the second TTI is previous to, equal to, or subsequent to $K_2$. In some examples, the offset information is a bit sequence that may include a bit flag.

At 620, UE 115-b determines a second TTI for transmitting the aperiodic SRS based at least in part on the TTI offset identified at 615. UE 115-b may identify SRS resource that are located, for example, in the final 1, 2, or 4 symbols of a plurality of TTIs. The UE 115-a may determine the second TTI as being offset from the first TTI that included the grant by the TTI offset. In some examples, the TTI offset may be a zero TTI offset, and hence the second TTI and the first TTI may be the same TTI. Having identified the second TTI based on the offset information, UE 115-b may identify the SRS resource corresponding to the second TTI.

At 625, base station 105-b may identify offset information indicating a TTI offset relative to the grant transmitted at 605. Base station 105-b may identify offset information based on the same considerations as described with respect to UE 115-b at 615, and with respect to FIGS. 4-5. At 630, base station 105-b determines a second TTI for the aperiodic SRS based at least in part on the TTI offset. Base station 105-b may determine the second TTI based on the same considerations as described with respect to UE 115-b at 620, and with respect to FIGS. 4-5.

At 635, base station 105-b monitors, for the aperiodic SRS, at least on symbol period of the second TTI corresponding to at least on symbol index of the SRS resource. At 640, UE 115-b transmits and base station 105-b receives the aperiodic SRS in the SRS resource of the second TTI.

At 645, base station 105-b generates a channel measurement based at least in part on the aperiodic SRS received at 640. At 650, base station 105-b generates a frequency dependent scheduling decision based at least in part on the channel measurement. Base station 105-b may perform subsequent communications with UE 115-b based on the generated scheduling decision.

Figure 7:
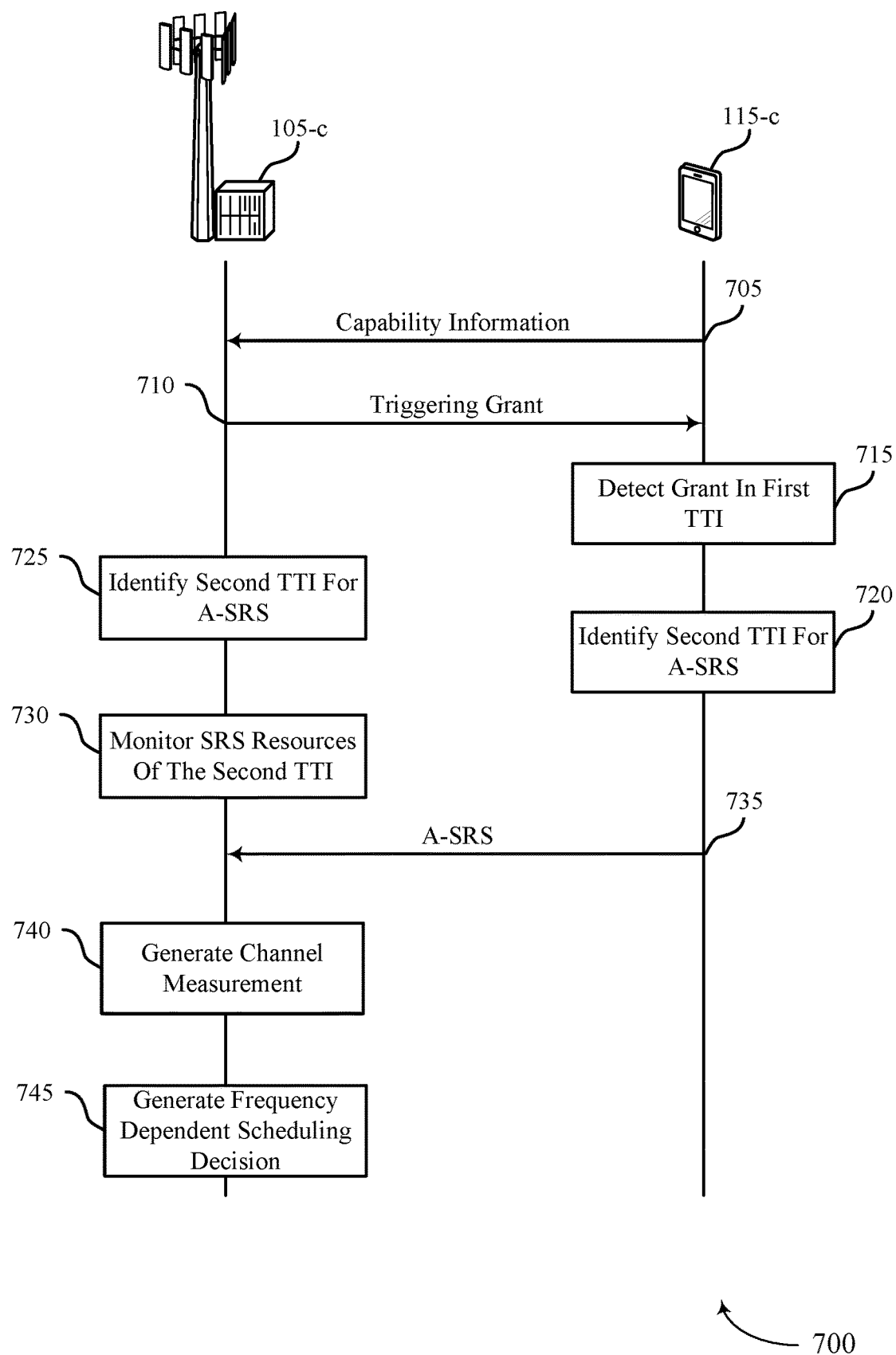
FIG. 7 illustrates an example of a process flow in accordance with aspects of the present disclosure.

FIG. 7 illustrates an example of a process flow 700 in accordance with various aspects of the present disclosure. In some examples, process flow 700 may implement aspects of wireless communications system 100. Techniques used in process flow 700 may be implemented by a UE 115-c and a base station 105-c, which may be examples of corresponding devices as described with reference to wireless communications systems 100 and 200.

At 705, UE 115-c may transmit capability information to the base station 105-c. The capability information may indicate, for example, one or both of $N_0$ delay and $N_2$ delay of the UE 115-c. Operation 705 is optional and maybe skipped. If skipped, the base station 105-c may utilize specified capability information (e.g., default capability information that indicates default $N_0$ delay and $N_2$ delay) for UEs operating within a wireless communication system, such as system 100.

At 710, base station 105-c transmits DCI in a TTI that grants the UE 115-a resources, wherein the grant is in accordance with the signaled or specified capability information. The grant may trigger UE 115-c to transmit an aperiodic SRS. The triggering grant may be an uplink grant or a downlink grant. At 715, UE 115-c may detect the grant triggering the transmission of an aperiodic SRS. The grant may be detected within a first TTI.

At 720, UE 115-c may identify a second TTI based at least in part on a first number of symbol periods between receipt of the grant by the UE and when the UE is capable of transmitting uplink data (e.g., based on $N_0$ delay or $N_2$ delay). The first number of symbol periods may meet or be less than a difference between a number of symbol periods between an SRS resource of the second TTI and a control channel of the first TTI. The first number of symbol periods may be the number of symbol periods indicated in the capability information transmitted by UE 115-c at 705. That is, if the first number of symbol periods is less than or equal to the difference (e.g., different 425-a in FIG. 4) between the control channel (e.g., of slot n in FIG. 4) and the SRS resource of the first TTI (e.g., SRS resource 415-a), then the second TTI may be the same as the first TTI (e.g., the aperiodic SRS may be transmitted in the same TTI in which the triggering grant of 710 was received). However, if the first number of symbol periods is greater than the difference between the control channel and the SRS resource of the first TTI (e.g., different 425-b), then the second TTI may be a subsequent TTI to the first TTI (e.g., the aperiodic SRS may be transmitted on the SRS resource 415-b of a slot n+1 that is subsequent to the slot n that included the grant). At 725, base station 105-c may identify the second TTI for the aperiodic SRS, similar to the process described with respect to UE 115-c at 720.

At 730, base station 105-c may monitor the SRS resource of the second TTI. The monitoring may occur within at least on symbol period of the second TTI configured with an SRS resource. At 735, UE 115-c may transmit, and base station 105-c may receive, the aperiodic SRS in the SRS resource of the second TTI.

At 740, base station 105-c may generate a channel measurement based at least in part on the received aperiodic SRS. At 745, base station 105-c may generate a frequency dependent scheduling decision based at least in part on the channel measurement. Base station 105-c may subsequently communicate with UE 115-c based on the generated scheduling decision.

Beneficially, the techniques described herein may provide for triggering a UE to transmit an SRS in a TTI relative to a TTI that includes a grant.

Figure 8:
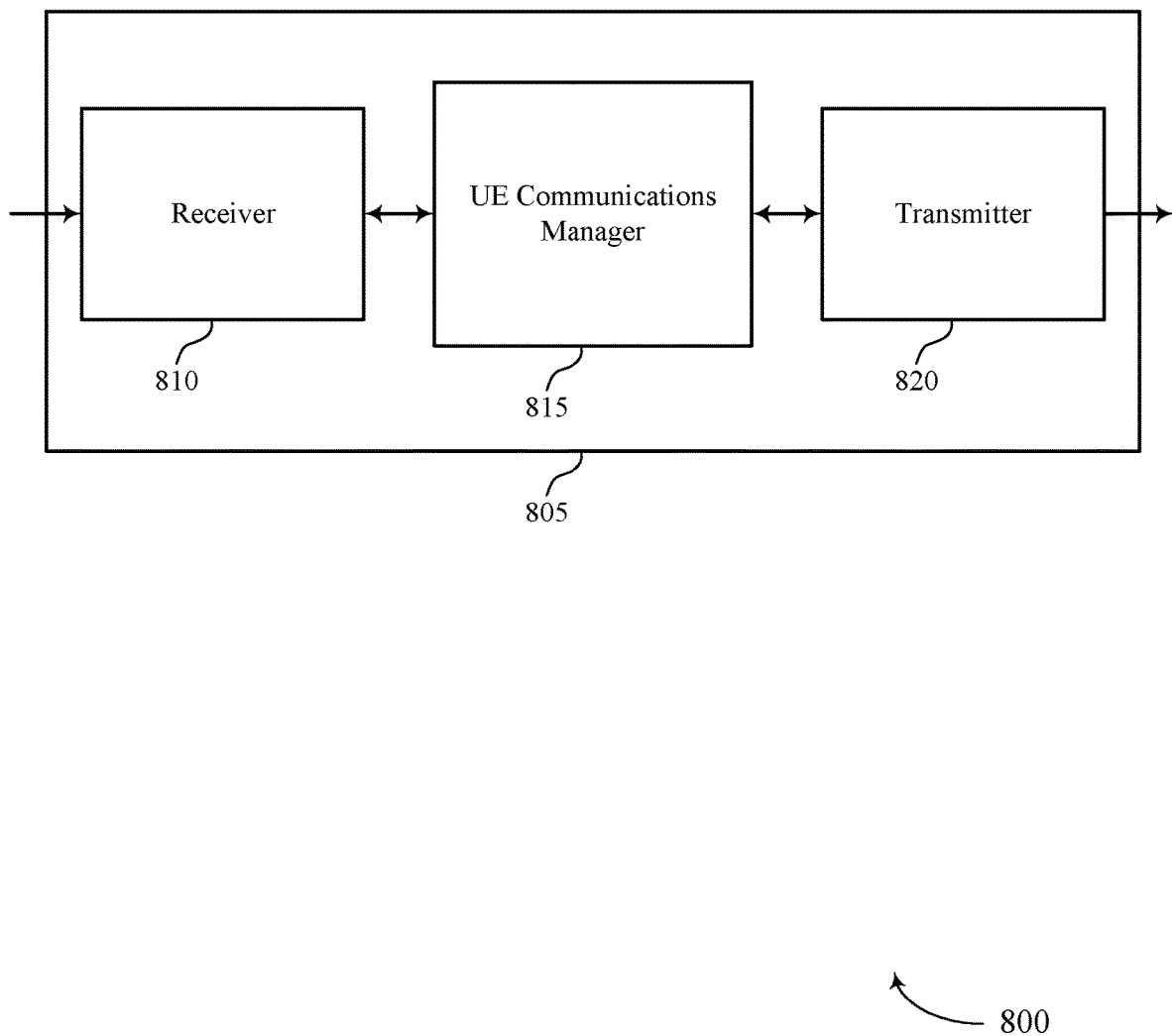
FIGS. 8 through 10 show block diagrams of a device in accordance with aspects of the present disclosure.

FIG. 8 shows a block diagram 800 of a wireless device 805 in accordance with aspects of the present disclosure. Wireless device 805 may be an example of aspects of a user equipment (UE) 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to reference signal transmission and triggering, etc.). Information may be passed on to other components of the device. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11.

UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 may detect, within a first transmission time interval (TTI), a grant triggering the UE to transmit an aperiodic sounding reference signal (A-sounding reference signal (SRS)), identify offset information indicating a TTI offset relative to the grant, determine a second TTI for transmitting the A-SRS based on the TTI offset, and transmit the A-SRS in an SRS resource of the second TTI. The UE communications manager 815 may also detect, within a first TTI, a grant triggering the UE to transmit an aperiodic sounding reference signal (A-SRS), identify a second TTI based on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI, and transmit the A-SRS in the SRS resource of the second TTI.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
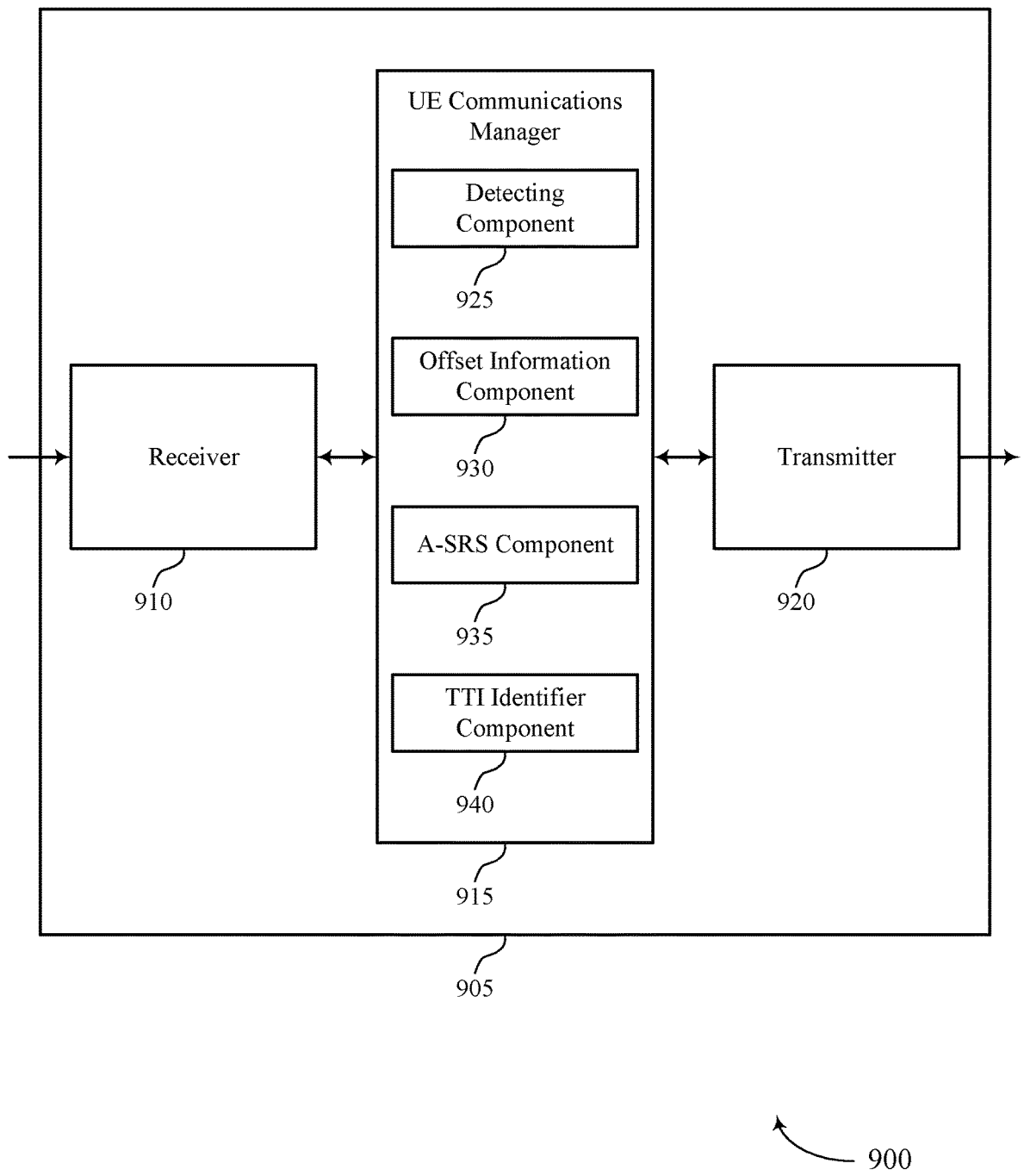

FIG. 9 shows a block diagram 900 of a wireless device 905 in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to reference signal transmission and triggering, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11.

UE communications manager 915 may also include detecting component 925, offset information component 930, A-SRS component 935, and TTI identifier component 940.

Detecting component 925 may detect, within a first TTI, a grant triggering the UE to transmit an aperiodic sounding reference signal (A-SRS) and receive downlink control information of the first TTI that includes the offset information, where the grant indicates resources of a shared data channel allocated to the UE for transmission of uplink data, and where the offset information includes a bit sequence corresponding to a number of TTIs occurring between receipt of the grant by the UE and when the UE is instructed to transmit uplink data in accordance with the grant. In some cases, the grant indicates resources of a shared data channel allocated to the UE for reception of downlink data.

Offset information component 930 may identify offset information indicating a TTI offset relative to the grant, receive downlink control information of the first TTI that includes the offset information, where the grant indicates resources of a shared data channel allocated to the UE for transmission of uplink data, and where the offset information is a bit flag indicating whether the UE is to use a first value for the TTI offset indicated in the downlink control information or a second semi-statically configured value for the TTI offset, receive downlink control information of the first TTI that includes the offset information, where the grant indicates resources of a shared data channel allocated to the UE for transmission of uplink data, and where the offset information includes a bit flag indicating whether the UE is to use a first value for the TTI offset indicated in the downlink control information or a second value for the TTI offset, and receive control signaling semi-statically indicating a defined value, where the second value for the TTI offset is a function of the first value for the TTI offset and the defined value. In some cases, identifying the offset information further includes retrieving the offset information from memory, where the UE is preconfigured with the offset information. In some cases, identifying the offset information further includes: receiving the offset information in downlink control information of the first TTI, where the offset information indicates a delay corresponding to a number of TTIs occurring between receipt of the grant by the UE and when the UE is instructed to transmit uplink data in accordance with the grant. In some cases, identifying the second TTI further includes: identifying the second TTI as being offset from the first TTI by the TTI offset. In some cases, identifying the second TTI includes: determining that the TTI offset is a zero TTI offset, where the second TTI and the first TTI are a same TTI. In some cases, identifying the offset information further includes receiving control signaling that semi-statically configures the UE with the offset information. In some cases, identifying the offset information further includes: receiving downlink control information of the first TTI that includes the offset information for dynamically configuring the UE with the TTI offset. In some cases, the first value is K2 and the second TTI is a TTI occurring prior to a TTI corresponding to the first value.

A-SRS component 935 may determine a second TTI for transmitting the A-SRS based on the TTI offset, transmit the A-SRS in an SRS resource of the second TTI, and transmit the A-SRS in the SRS resource of the second TTI. In some cases, determining the second TTI further includes: determining a TTI index following the delay indicated in the offset information, where the second TTI corresponds to the TTI index. In some cases, the SRS resource corresponds to a subset of symbol periods within the second TTI.

TTI identifier component 940 may identify a second TTI based on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI. In some cases, identifying the second TTI further includes: identifying the second TTI based on a second number of symbol periods between receipt of the grant by the UE and when the UE is capable of receiving downlink data. In some cases, identifying the second TTI further includes: determining a maximum of the first number of symbol periods and the second number of symbol periods. In some cases, the first number of symbol periods and the second number of symbol periods are a specified capability of the UE. In some cases, identifying the second TTI includes: determining that the second TTI and the first TTI are a same TTI.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
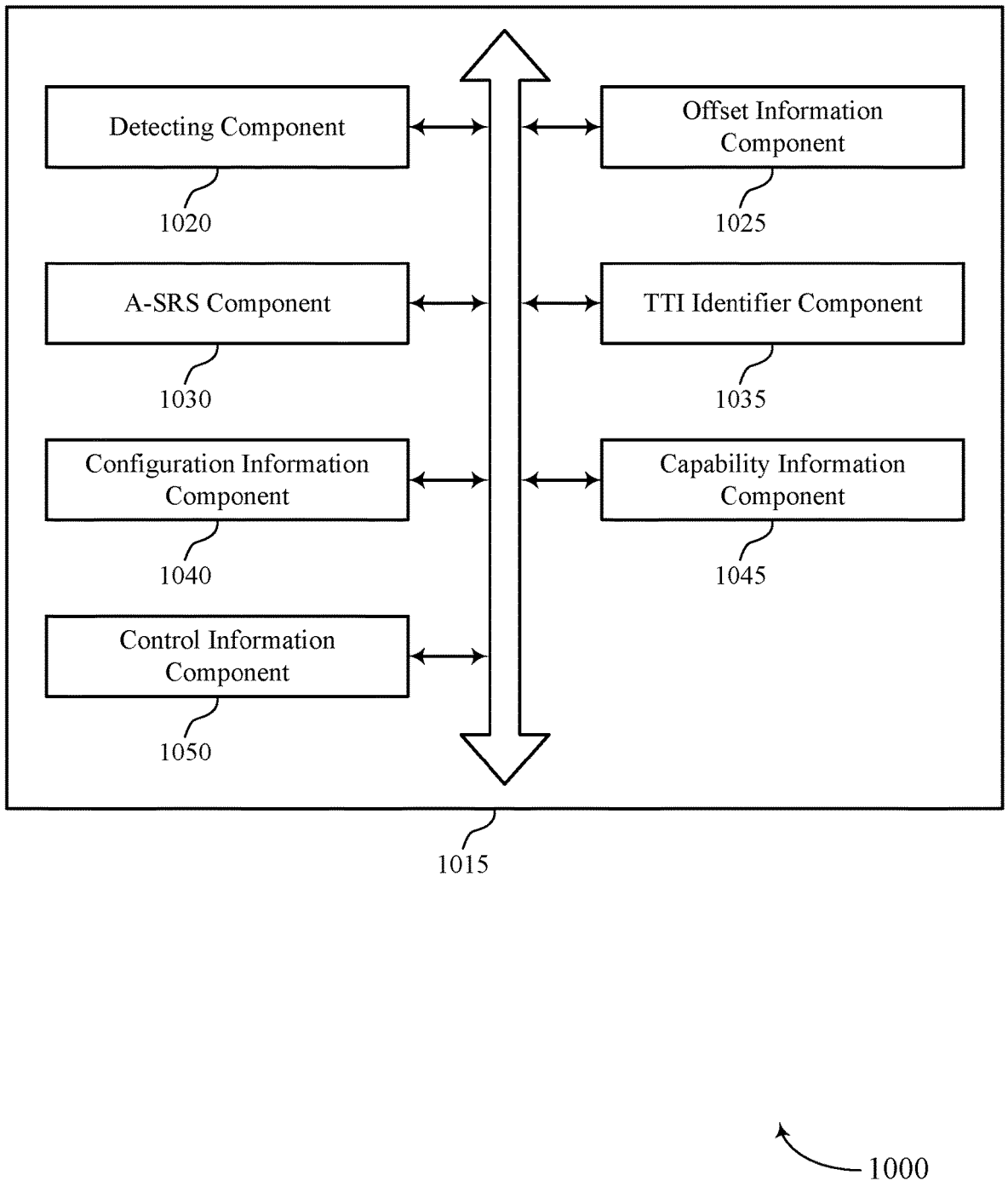

FIG. 10 shows a block diagram 1000 of a UE communications manager 1015 in accordance with aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include detecting component 1020, offset information component 1025, A-SRS component 1030, TTI identifier component 1035, configuration information component 1040, capability information component 1045, and control information component 1050. Each of these modules may communicate, directly or indirectly, with one another (e.g., via one or more buses).

Detecting component 1020 may detect, within a first TTI, a grant triggering the UE to transmit an aperiodic sounding reference signal (A-SRS) and receive downlink control information of the first TTI that includes the offset information, where the grant indicates resources of a shared data channel allocated to the UE for transmission of uplink data, and where the offset information includes a bit sequence corresponding to a number of TTIs occurring between receipt of the grant by the UE and when the UE is instructed to transmit uplink data in accordance with the grant. In some cases, the grant indicates resources of a shared data channel allocated to the UE for reception of downlink data.

Offset information component 1025 may identify offset information indicating a TTI offset relative to the grant, receive downlink control information of the first TTI that includes the offset information, where the grant indicates resources of a shared data channel allocated to the UE for transmission of uplink data, and where the offset information is a bit flag indicating whether the UE is to use a first value for the TTI offset indicated in the downlink control information or a second semi-statically configured value for the TTI offset, receive downlink control information of the first TTI that includes the offset information, where the grant indicates resources of a shared data channel allocated to the UE for transmission of uplink data, and where the offset information includes a bit flag indicating whether the UE is to use a first value for the TTI offset indicated in the downlink control information or a second value for the TTI offset, and receive control signaling semi-statically indicating a defined value, where the second value for the TTI offset is a function of the first value for the TTI offset and the defined value. In some cases, identifying the offset information further includes retrieving the offset information from memory, where the UE is preconfigured with the offset information. In some cases, identifying the offset information further includes: receiving the offset information in downlink control information of the first TTI, where the offset information indicates a delay corresponding to a number of TTIs occurring between receipt of the grant by the UE and when the UE is instructed to transmit uplink data in accordance with the grant. In some cases, identifying the second TTI further includes: identifying the second TTI as being offset from the first TTI by the TTI offset. In some cases, identifying the second TTI includes: determining that the TTI offset is a zero TTI offset, where the second TTI and the first TTI are a same TTI. In some cases, identifying the offset information further includes receiving control signaling that semi-statically configures the UE with the offset information. In some cases, identifying the offset information further includes: receiving downlink control information of the first TTI that includes the offset information for dynamically configuring the UE with the TTI offset. In some cases, the first value is K2 and the second TTI is a TTI occurring prior to a TTI corresponding to the first value.

A-SRS component 1030 may determine a second TTI for transmitting the A-SRS based on the TTI offset, transmit the A-SRS in an SRS resource of the second TTI, and transmit the A-SRS in the SRS resource of the second TTI. In some cases, determining the second TTI further includes: determining a TTI index following the delay indicated in the offset information, where the second TTI corresponds to the TTI index. In some cases, the SRS resource corresponds to a subset of symbol periods within the second TTI.

TTI identifier component 1035 may identify a second TTI based on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI. In some cases, identifying the second TTI further includes: identifying the second TTI based on a second number of symbol periods between receipt of the grant by the UE and when the UE is capable of receiving downlink data. In some cases, identifying the second TTI further includes: determining a maximum of the first number of symbol periods and the second number of symbol periods. In some cases, the first number of symbol periods and the second number of symbol periods are a specified capability of the UE. In some cases, identifying the second TTI includes: determining that the second TTI and the first TTI are a same TTI.

Configuration information component 1040 may receive configuration information that configures the UE to transmit the A-SRS within at least one symbol index of a set of different symbol indexes of a TTI, where transmitting the A-SRS in the SRS resource of the second TTI further includes: transmitting the A-SRS within at least one symbol period of the second TTI corresponding to the at least one symbol index. In some cases, receiving configuration information that configures the UE to transmit the A-SRS within at least one symbol index of a set of different symbol indexes of a TTI, where transmitting the A-SRS in the SRS resource of the second TTI further includes: transmitting the A-SRS within at least one symbol period of the second TTI corresponding to the at least one symbol index. In some cases, receiving configuration information that configures the UE to transmit the A-SRS within at least one symbol index of a set of different symbol indexes of a TTI, where transmitting the A-SRS in the SRS resource of the second TTI further includes: transmitting the A-SRS within at least one symbol period of the second TTI corresponding to the at least one symbol index, where a number of symbol periods between the at least one symbol period of the second TTI and the control channel of the first TTI meets or exceeds the maximum.

Capability information component 1045 may transmit capability information indicating a number of symbol periods between receipt of the grant by the UE and when the UE is capable of transmitting uplink data in accordance with the grant, where the delay corresponds to the capability information, transmit capability information indicating the first number of symbol periods, and transmit capability information indicating the first number of symbol periods and the second number of symbol periods. In some cases, the delay corresponds to a specified capability information indicating a number of symbol periods between receipt of the grant by the UE and when the UE is capable of transmitting uplink data in accordance with the grant.

Control information component 1050 may receive downlink control information of the first TTI that includes the offset information, where the grant indicates resources of a shared data channel allocated to the UE for reception of downlink data. In some cases, the offset information is a bit sequence included within downlink control information of the first TTI, the bit sequence corresponding to a number of TTIs occurring between receipt of the grant by the UE and when the UE is capable of transmitting uplink data in accordance with the grant. In some cases, the bit sequence is configured to jointly trigger transmission of a zero power channel state information reference signal (channel state information (CSI)-RS) from a base station and transmission of the A-SPS from the UE.

Figure 11:
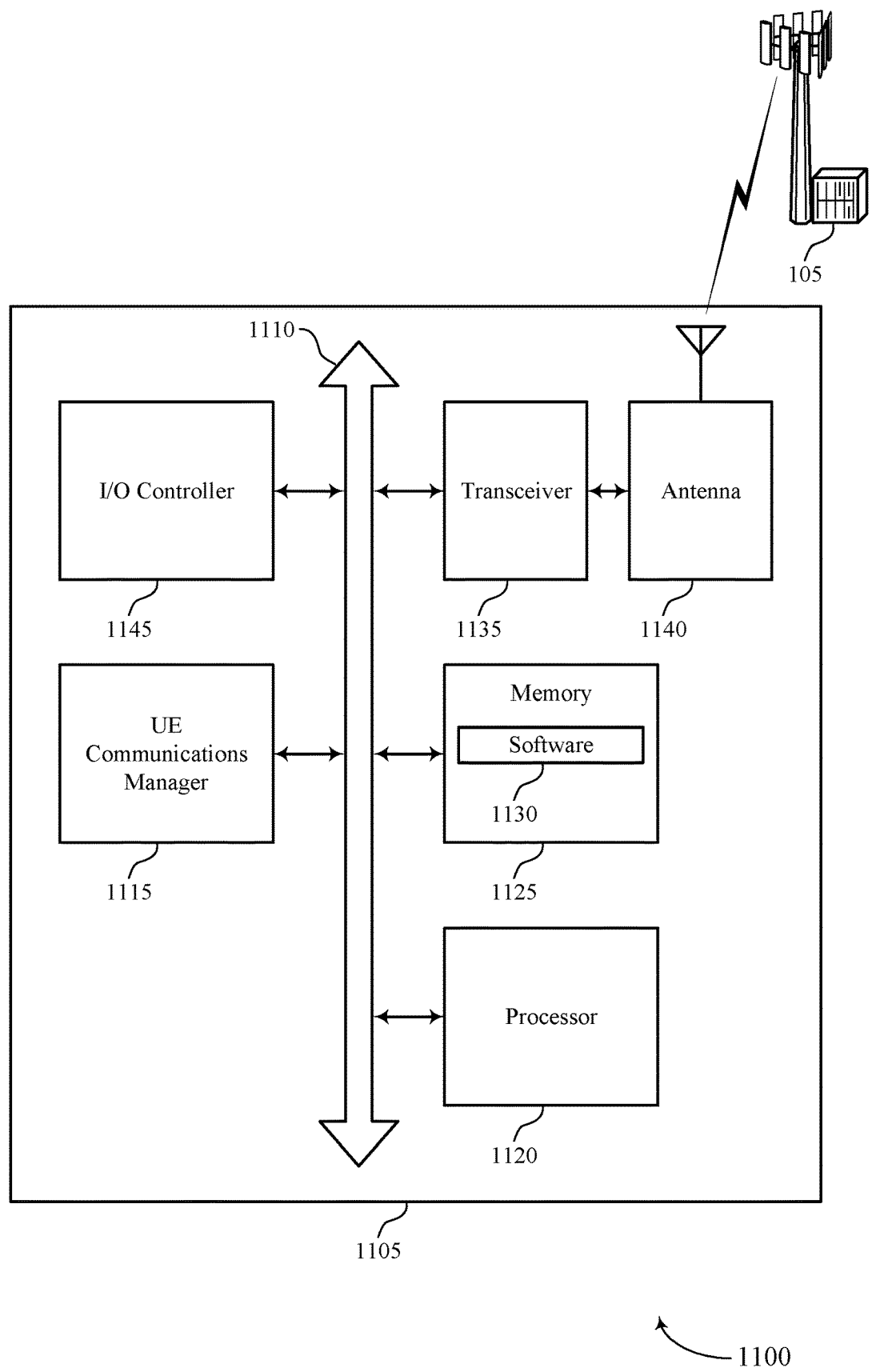
FIG. 11 illustrates a block diagram of a system including a UE in accordance with aspects of the present disclosure.

FIG. 11 shows a diagram of a system 1100 including a device 1105 in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting reference signal transmission and triggering).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support reference signal transmission and triggering. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
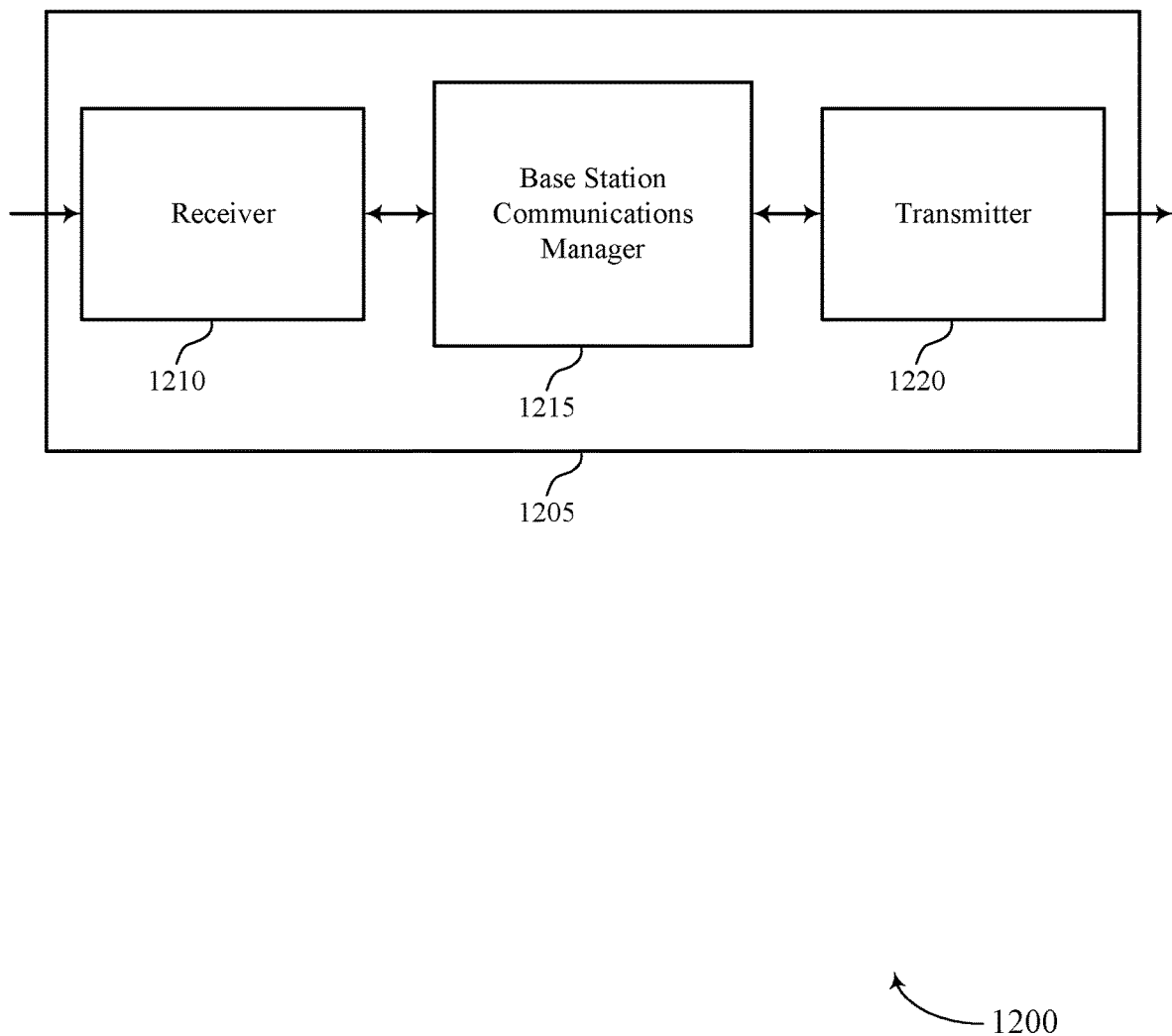
FIGS. 12 through 14 show block diagrams of a device in accordance with aspects of the present disclosure.

FIG. 12 shows a block diagram 1200 of a wireless device 1205 in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to reference signal transmission and triggering, etc.). Information may be passed on to other components of the device. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15.

Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may transmit, within a first TTI, a grant triggering a UE to transmit an aperiodic sounding reference signal (A-SRS), identify offset information indicating a TTI offset relative to the grant, determine a second TTI for the A-SRS based on the TTI offset, and monitor an SRS resource of the second TTI for the A-SRS. The base station communications manager 1215 may also transmit, within a first TTI, a grant triggering a UE to transmit an aperiodic sounding reference signal (A-SRS), identify a second TTI based on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI, and monitor the SRS resource of the second TTI for the A-SRS.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
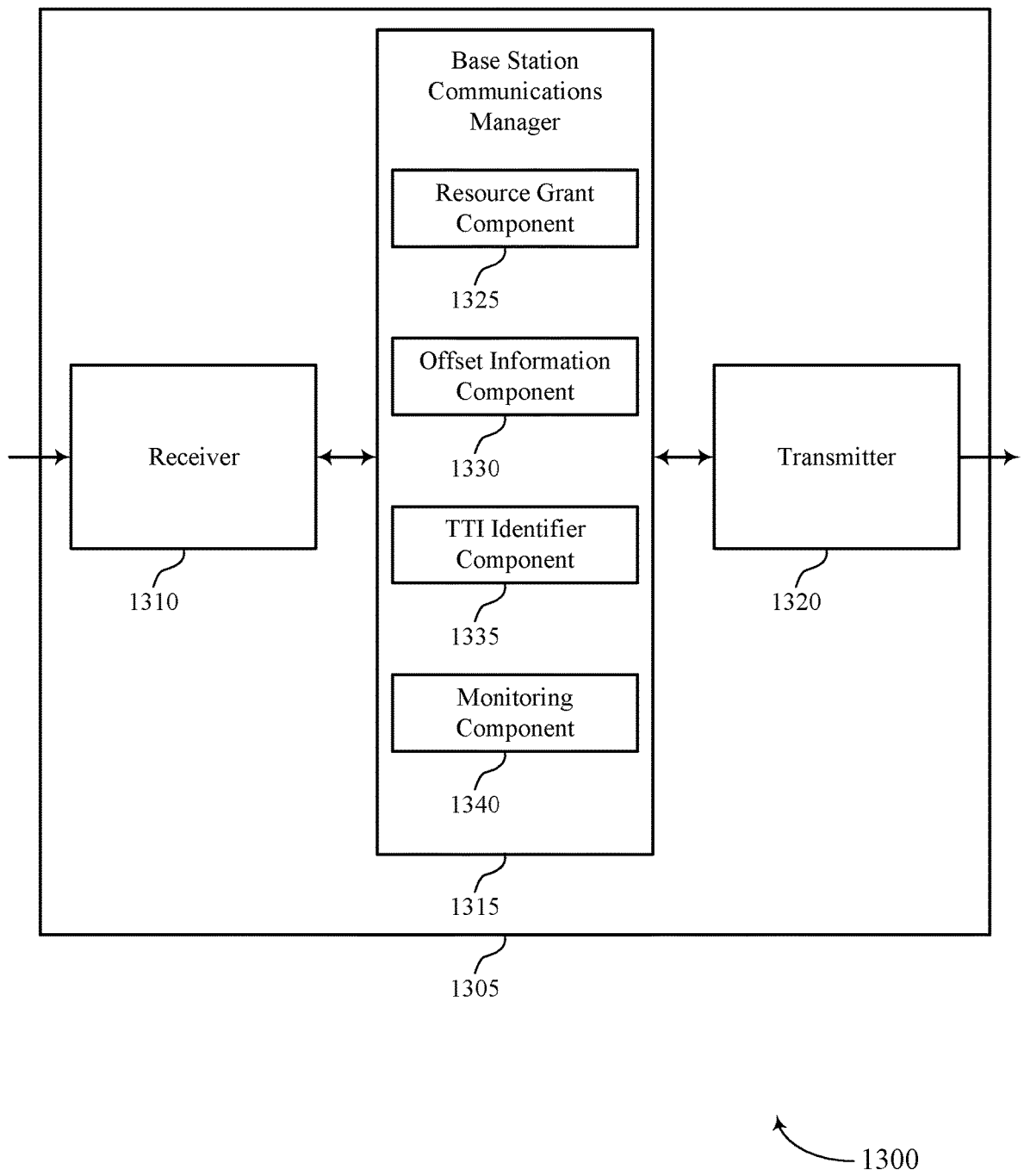

FIG. 13 shows a block diagram 1300 of a wireless device 1305 in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to reference signal transmission and triggering, etc.). Information may be passed on to other components of the device. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15.

Base station communications manager 1315 may also include resource grant component 1325, offset information component 1330, TTI identifier component 1335, and monitoring component 1340.

Resource grant component 1325 may transmit, within a first TTI, a grant triggering a UE to transmit an aperiodic sounding reference signal (A-SRS). In some cases, the grant indicates resources of a shared data channel allocated to the UE for reception of downlink data.

Offset information component 1330 may identify offset information indicating a TTI offset relative to the grant. In some cases, the offset information corresponds to a TTI index following the delay, and where the second TTI corresponds to the TTI index. In some cases, the offset information includes a bit sequence corresponding to a number of TTIs occurring between receipt of the grant by the UE and when the UE is instructed to transmit uplink data in accordance with the grant. In some cases, the bit sequence is configured to jointly trigger transmission of a zero power channel state information reference signal (CSIRS) from the base station and transmission of the A-SPS from a UE. In some cases, the UE is preconfigured with the TTI offset.

TTI identifier component 1335 may determine a second TTI for the A-SRS based on the TTI offset and identify a second TTI based on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI. In some cases, identifying the second TTI further includes: identifying the second TTI as being offset from the first TTI by the TTI offset. In some cases, identifying the second TTI includes: determining that the TTI offset is a zero TTI offset, where the second TTI and the first TTI are a same TTI. In some cases, identifying the second TTI further includes: identifying the second TTI based on a second number of symbol periods between receipt of the grant by the UE and when the UE is capable of receiving downlink data. In some cases, identifying the second TTI further includes: determining a maximum of the first number of symbol periods and the second number of symbol periods. In some cases, identifying the second TTI includes: determining that the second TTI and the first TTI are a same TTI.

Monitoring component 1340 may monitor an SRS resource of the second TTI for the A-SRS and monitor the SRS resource of the second TTI for the A-SRS.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
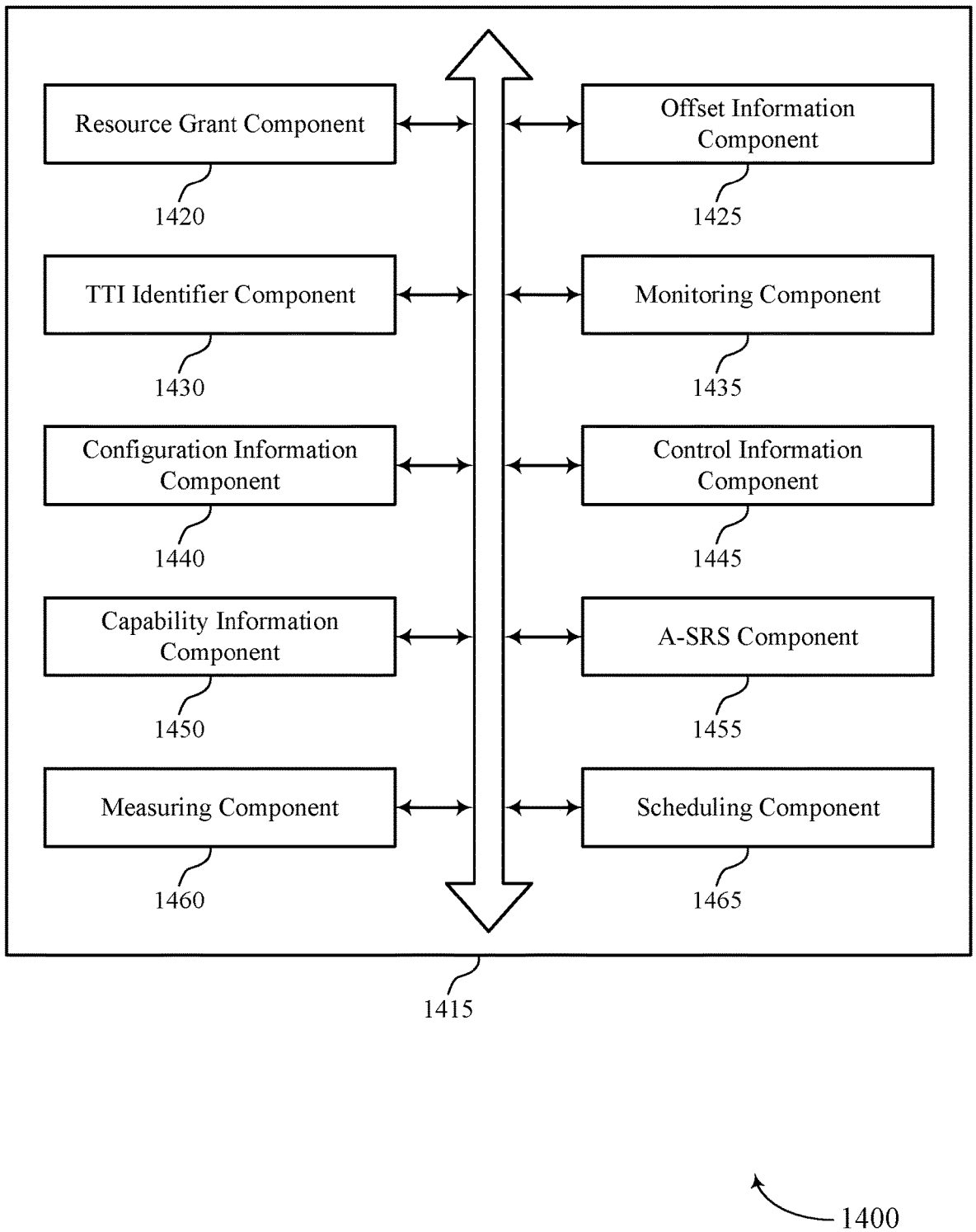

FIG. 14 shows a block diagram 1400 of a base station communications manager 1415 in accordance with aspects of the present disclosure. The base station communications manager 1415 may be an example of aspects of a base station communications manager 1515 described with reference to FIGS. 12, 13, and 15. The base station communications manager 1415 may include resource grant component 1420, offset information component 1425, TTI identifier component 1430, monitoring component 1435, configuration information component 1440, control information component 1445, capability information component 1450, A-SRS component 1455, measuring component 1460, and scheduling component 1465. Each of these modules may communicate, directly or indirectly, with one another (e.g., via one or more buses).

Resource grant component 1420 may transmit, within a first TTI, a grant triggering a UE to transmit an aperiodic sounding reference signal (A-SRS). In some cases, the grant indicates resources of a shared data channel allocated to the UE for reception of downlink data.

Offset information component 1425 may identify offset information indicating a TTI offset relative to the grant. In some cases, the offset information corresponds to a TTI index following the delay, and where the second TTI corresponds to the TTI index. In some cases, the offset information includes a bit sequence corresponding to a number of TTIs occurring between receipt of the grant by the UE and when the UE is instructed to transmit uplink data in accordance with the grant. In some cases, the bit sequence is configured to jointly trigger transmission of a zero power channel state information reference signal (CSIRS) from the base station and transmission of the A-SPS from a UE. In some cases, the UE is preconfigured with the TTI offset.

TTI identifier component 1430 may determine a second TTI for the A-SRS based on the TTI offset and identify a second TTI based on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI. In some cases, identifying the second TTI further includes: identifying the second TTI as being offset from the first TTI by the TTI offset. In some cases, identifying the second TTI includes: determining that the TTI offset is a zero TTI offset, where the second TTI and the first TTI are a same TTI. In some cases, identifying the second TTI further includes: identifying the second TTI based on a second number of symbol periods between receipt of the grant by the UE and when the UE is capable of receiving downlink data. In some cases, identifying the second TTI further includes: determining a maximum of the first number of symbol periods and the second number of symbol periods. In some cases, identifying the second TTI includes: determining that the second TTI and the first TTI are a same TTI.

Monitoring component 1435 may monitor an SRS resource of the second TTI for the A-SRS and monitor the SRS resource of the second TTI for the A-SRS.

Configuration information component 1440 may transmit configuration information to configure the UE to transmit the A-SRS within at least one symbol index of a set of different symbol indexes of a TTI, where monitoring the SRS resource of the second TTI for the A-SRS further includes: monitoring at least one symbol period of the second TTI corresponding to the at least one symbol index for the A-SRS. In some cases, transmitting configuration information to configure the UE to transmit the A-SRS within at least one symbol index of a set of different symbol indexes of a TTI, where monitoring the SRS resource of the second TTI for the A-SRS further includes: monitoring the A-SRS within at least one symbol period of the second TTI corresponding to the at least one symbol index. In some cases, transmitting configuration information to configure the UE to transmit the A-SRS within at least one symbol index of a set of different symbol indexes of a TTI, where monitoring the SRS resource of the second TTI for the A-SRS further includes: monitoring the SRS resource of the second TTI for the A-SRS within at least one symbol period of the second TTI corresponding to the at least one symbol index, where a number of symbol periods between the at least one symbol period of the second TTI and the control channel of the first TTI meets or exceeds the maximum.

Control information component 1445 may transmit, within the first TTI, downlink control information that includes the offset information, where the offset information indicates a delay corresponding to a number of TTIs occurring between receipt of the grant by the UE and when the UE is instructed to transmit uplink data in accordance with the grant, transmit downlink control information in the first TTI that includes the offset information, where the grant indicates resources of a shared data channel allocated to the UE for transmission of uplink data, and where the offset information includes a bit flag indicating whether the UE is to use a first value for the TTI offset indicated in the downlink control information or a second semi-statically configured value for the TTI offset, transmit downlink control information in the first TTI that includes the offset information, where the grant indicates resources of a shared data channel allocated to the UE for transmission of uplink data, and where the offset information includes a bit sequence indicating that the TTI offset corresponds to a number of TTIs occurring between receipt of the grant by the UE and when the UE is instructed to transmit uplink data in accordance with the grant, transmit downlink control information in the first TTI that includes the offset information, where the grant indicates resources of a shared data channel allocated to the UE for transmission of uplink data, where the offset information includes a bit flag indicating whether the UE is to use a first value for the TTI offset indicated in the downlink control information or a second value for the TTI offset, transmit control signaling semi-statically indicating a defined value, where the second value for the TTI offset is a function of the first value for the TTI offset and the defined value, transmit downlink control information in the first TTI that includes the offset information, where the grant indicates resources of a shared data channel allocated to the UE for reception of downlink data, transmit control signaling to semi-statically configure the UE with the offset information, and transmit downlink control information within the first TTI to dynamically configure the UE with the offset information. In some cases, the first value is K2 and the second TTI is a TTI occurring prior to a TTI corresponding to the first value.

Capability information component 1450 may receive capability information indicating a number of symbol periods between receipt of the grant by the UE and when the UE is capable of transmitting uplink data in accordance with the grant, where the delay corresponds to the capability information, receive capability information indicating the first number of symbol periods, and receive capability information indicating the first number of symbol periods and the second number of symbol periods. In some cases, the delay corresponds to a specified capability information indicating a number of symbol periods between receipt of the grant by the UE and when the UE is capable of transmitting uplink data in accordance with the grant. In some cases, the first number of symbol periods and the second number of symbol periods respectively correspond to defined capability information of the UE.

A-SRS component 1455 may receive the A-SRS within the SRS resource of the second TTI. In some cases, the SRS resource corresponds to a subset of symbol periods within the second TTI.

Measuring component 1460 may generate a channel measurement based on the received A-SRS.

Scheduling component 1465 may generate a frequency dependent scheduling decision based on the channel measurement.

Figure 15:
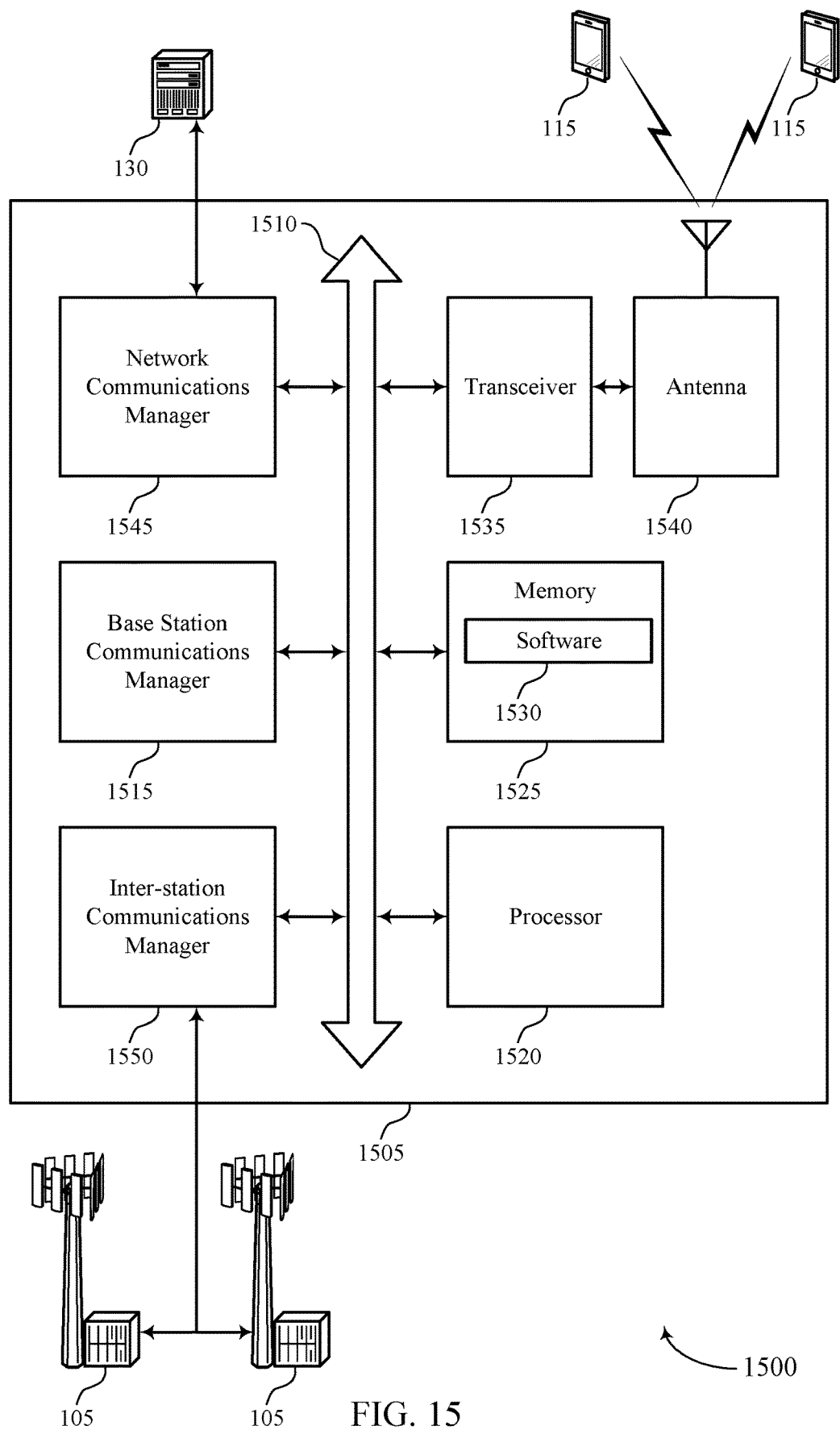
FIG. 15 illustrates a block diagram of a system including a base station in accordance with aspects of the present disclosure.

FIG. 15 shows a diagram of a system 1500 including a device 1505 in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting reference signal transmission and triggering).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support reference signal transmission and triggering. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within a Long Term Evolution (LTE)/LTE-A wireless communication network technology to provide communication between base stations 105.

Figure 16:
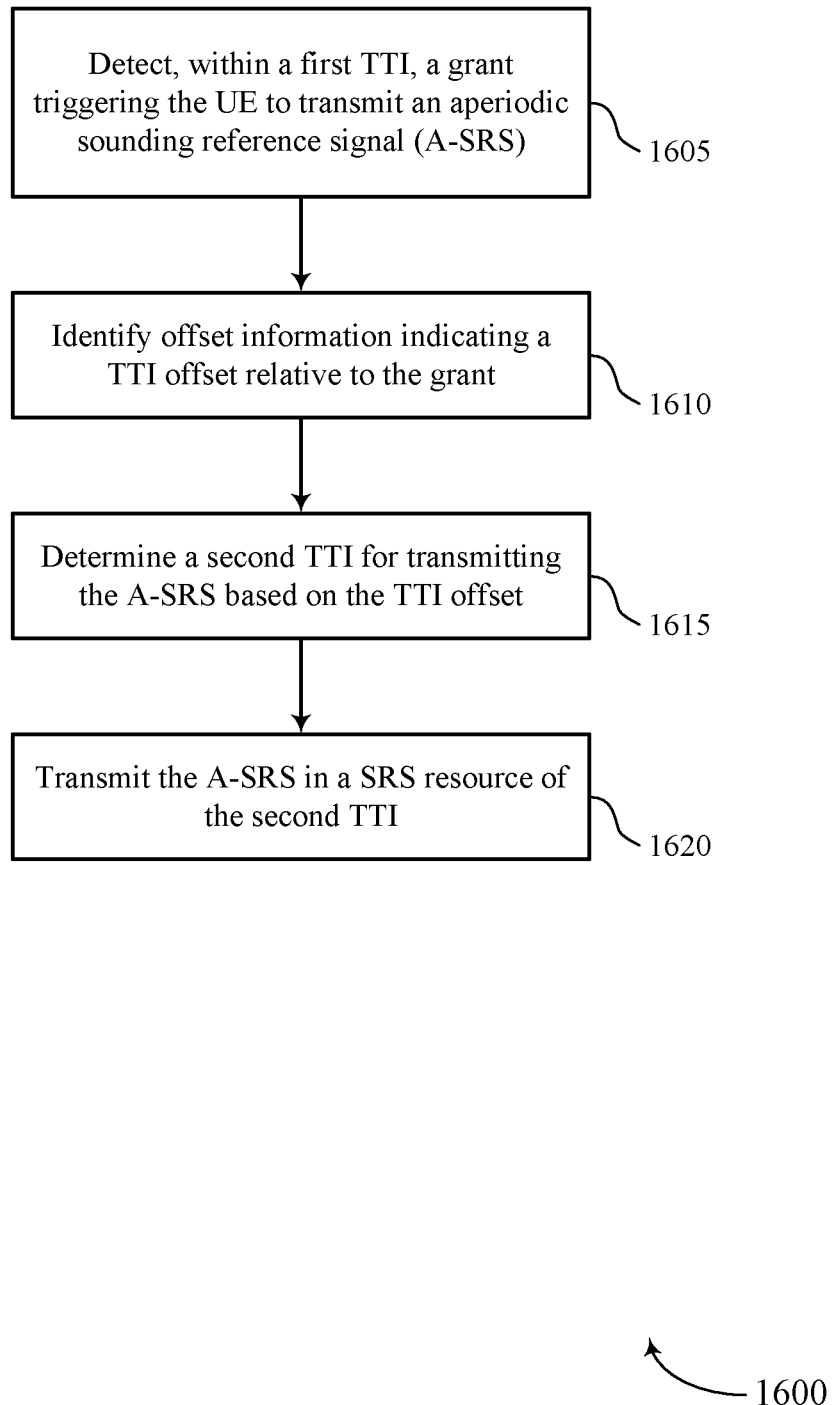
FIGS. 16 through 21 illustrate methods for reference signal transmission and triggering in accordance with aspects of the present disclosure.

FIG. 16 shows a flowchart illustrating a method 1600 for reference signal transmission and triggering in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may detect, within a first transmission time interval (TTI), a grant triggering the UE to transmit an aperiodic sounding reference signal (A-SRS). The operations of 1605 may be performed according to the methods described herein. In certain examples, aspects of the operations of 1605 may be performed by a detecting component as described with reference to FIGS. 8 through 11.

At 1610 the UE 115 may identify offset information indicating a TTI offset relative to the grant. The operations of 1610 may be performed according to the methods described herein. In certain examples, aspects of the operations of 1610 may be performed by an offset information component as described with reference to FIGS. 8 through 11.

At 1615 the UE 115 may determine a second TTI for transmitting the A-SRS based at least in part on the TTI offset. The operations of 1615 may be performed according to the methods described herein. In certain examples, aspects of the operations of 1615 may be performed by a A-SRS component as described with reference to FIGS. 8 through 11.

At 1620 the UE 115 may transmit the A-SRS in an SRS resource of the second TTI. The operations of 1620 may be performed according to the methods described herein. In certain examples, aspects of the operations of 1620 may be performed by a A-SRS component as described with reference to FIGS. 8 through 11.

Figure 17:
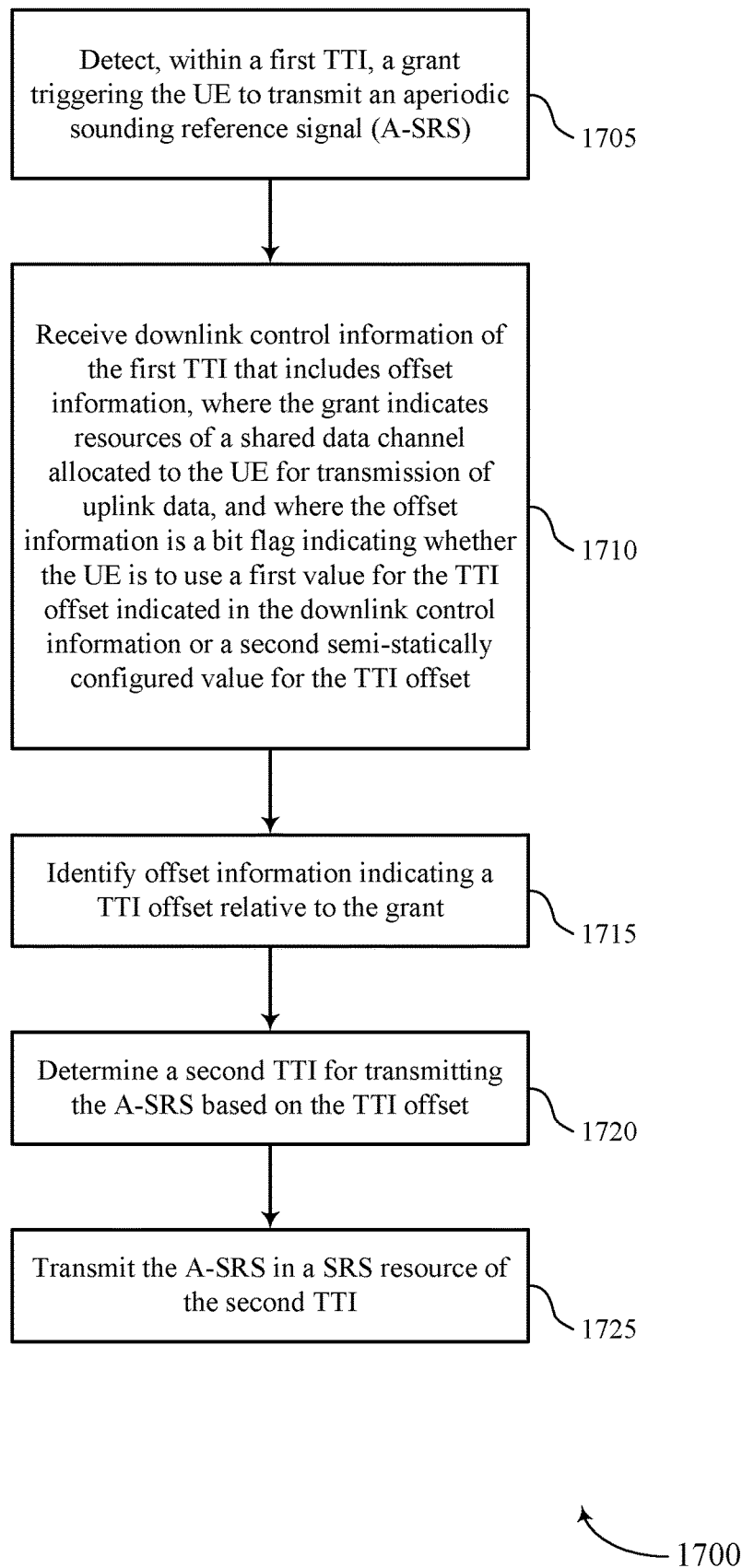

FIG. 17 shows a flowchart illustrating a method 1700 for reference signal transmission and triggering in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE 115 may execute a set of codes to control the functional elements of the device to perform the functions described below. Additionally, or alternatively, the UE 115 may perform aspects of the functions described below using special-purpose hardware.

At 1705 the UE 115 may detect, within a first transmission time interval (TTI), a grant triggering the UE to transmit an aperiodic sounding reference signal (A-SRS). The operations of 1705 may be performed according to the methods described herein. In certain examples, aspects of the operations of 1705 may be performed by a detecting component as described with reference to FIGS. 8 through 11.

At 1710 the UE 115 may receive downlink control information of the first TTI that includes offset information, wherein the grant indicates resources of a shared data channel allocated to the UE for transmission of uplink data, and wherein the offset information is a bit flag indicating whether the UE is to use a first value for the TTI offset indicated in the downlink control information or a second semi-statically configured value for the TTI offset. The operations of 1710 may be performed according to the methods described herein. In certain examples, aspects of the operations of 1710 may be performed by an offset information component as described with reference to FIGS. 8 through 11.

At 1715 the UE 115 may identify the offset information indicating a TTI offset relative to the grant. The operations of 1715 may be performed according to the methods described herein. In certain examples, aspects of the operations of 1715 may be performed by an offset information component as described with reference to FIGS. 8 through 11.

At 1720 the UE 115 may determine a second TTI for transmitting the A-SRS based at least in part on the TTI offset. The operations of 1720 may be performed according to the methods described herein. In certain examples, aspects of the operations of 1720 may be performed by a A-SRS component as described with reference to FIGS. 8 through 11.

At 1725 the UE 115 may transmit the A-SRS in an SRS resource of the second TTI. The operations of 1725 may be performed according to the methods described herein. In certain examples, aspects of the operations of 1725 may be performed by a A-SRS component as described with reference to FIGS. 8 through 11.

Figure 18:
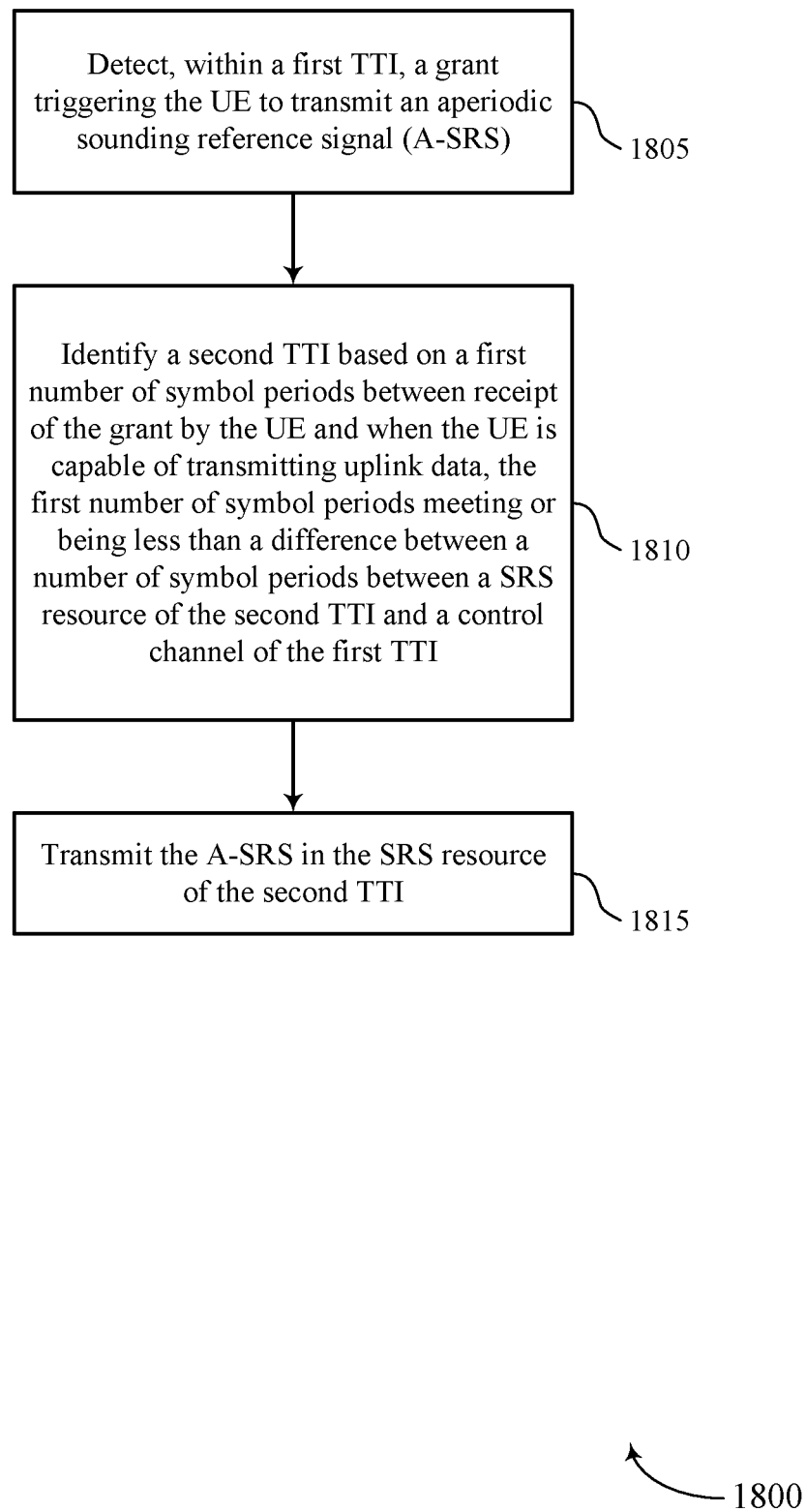

FIG. 18 shows a flowchart illustrating a method 1800 for reference signal transmission and triggering in accordance with aspects of the present disclosure. The operations of method 1800 may be implemented by a UE 115 or its components as described herein. For example, the operations of method 1800 may be performed by a UE communications manager as described with reference to FIGS. 8 through 11. In some examples, a UE 115 may execute a set of codes to control the functional elements of the device to perform the functions described below. Additionally, or alternatively, the UE 115 may perform aspects of the functions described below using special-purpose hardware.

At 1805 the UE 115 may detect, within a first transmission time interval (TTI), a grant triggering the UE to transmit an aperiodic sounding reference signal (A-SRS). The operations of 1805 may be performed according to the methods described herein. In certain examples, aspects of the operations of 1805 may be performed by a detecting component as described with reference to FIGS. 8 through 11.

At 1810 the UE 115 may identify a second TTI based at least in part on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI. The operations of 1810 may be performed according to the methods described herein. In certain examples, aspects of the operations of 1810 may be performed by a TTI identifier component as described with reference to FIGS. 8 through 11.

At 1815 the UE 115 may transmit the A-SRS in the SRS resource of the second TTI. The operations of 1815 may be performed according to the methods described herein. In certain examples, aspects of the operations of 1815 may be performed by a A-SRS component as described with reference to FIGS. 8 through 11.

Figure 19:
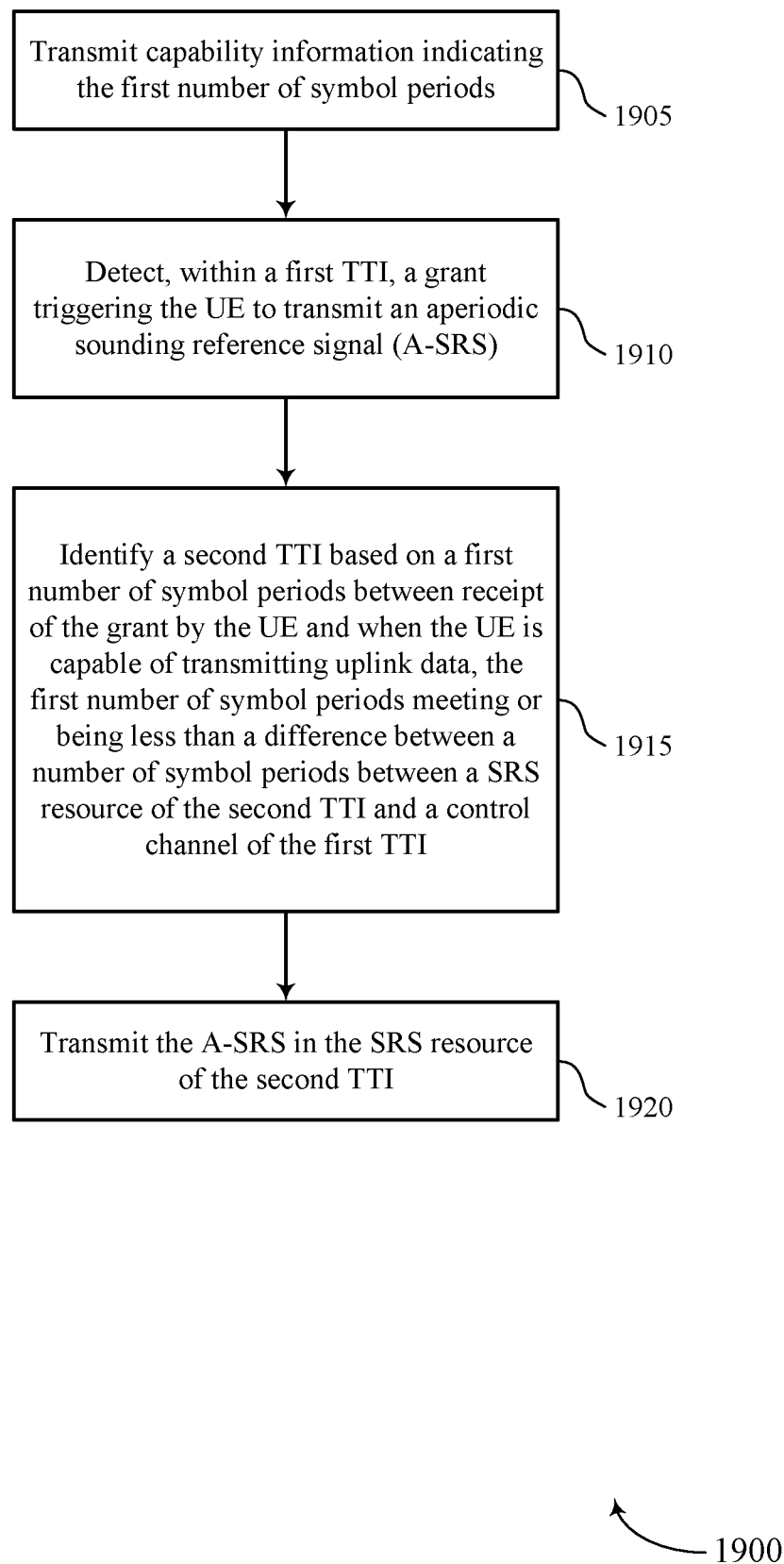

FIG. 19 shows a flowchart illustrating a method 1900 for reference signal transmission and triggering in accordance with aspects of the present disclosure. The operations of method 1900 may be implemented by a UE 115 or its components as described herein. For example, the operations of method 1900 may be performed by a UE communications manager as described with reference to FIGS. 8 through 11. In some examples, a UE 115 may execute a set of codes to control the functional elements of the device to perform the functions described below. Additionally, or alternatively, the UE 115 may perform aspects of the functions described below using special-purpose hardware.

At 1905 the UE 115 may transmit capability information indicating the first number of symbol periods. The operations of 1905 may be performed according to the methods described herein. In certain examples, aspects of the operations of 1905 may be performed by a capability information component as described with reference to FIGS. 8 through 11.

At 1910 the UE 115 may detect, within a first transmission time interval (TTI), a grant triggering the UE to transmit an aperiodic sounding reference signal (A-SRS). The operations of 1910 may be performed according to the methods described herein. In certain examples, aspects of the operations of 1910 may be performed by a detecting component as described with reference to FIGS. 8 through 11.

At 1915 the UE 115 may identify a second TTI based at least in part on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI. The operations of 1915 may be performed according to the methods described herein. In certain examples, aspects of the operations of 1915 may be performed by a TTI identifier component as described with reference to FIGS. 8 through 11.

At 1920 the UE 115 may transmit the A-SRS in the SRS resource of the second TTI. The operations of 1920 may be performed according to the methods described herein. In certain examples, aspects of the operations of 1920 may be performed by a A-SRS component as described with reference to FIGS. 8 through 11.

Figure 20:
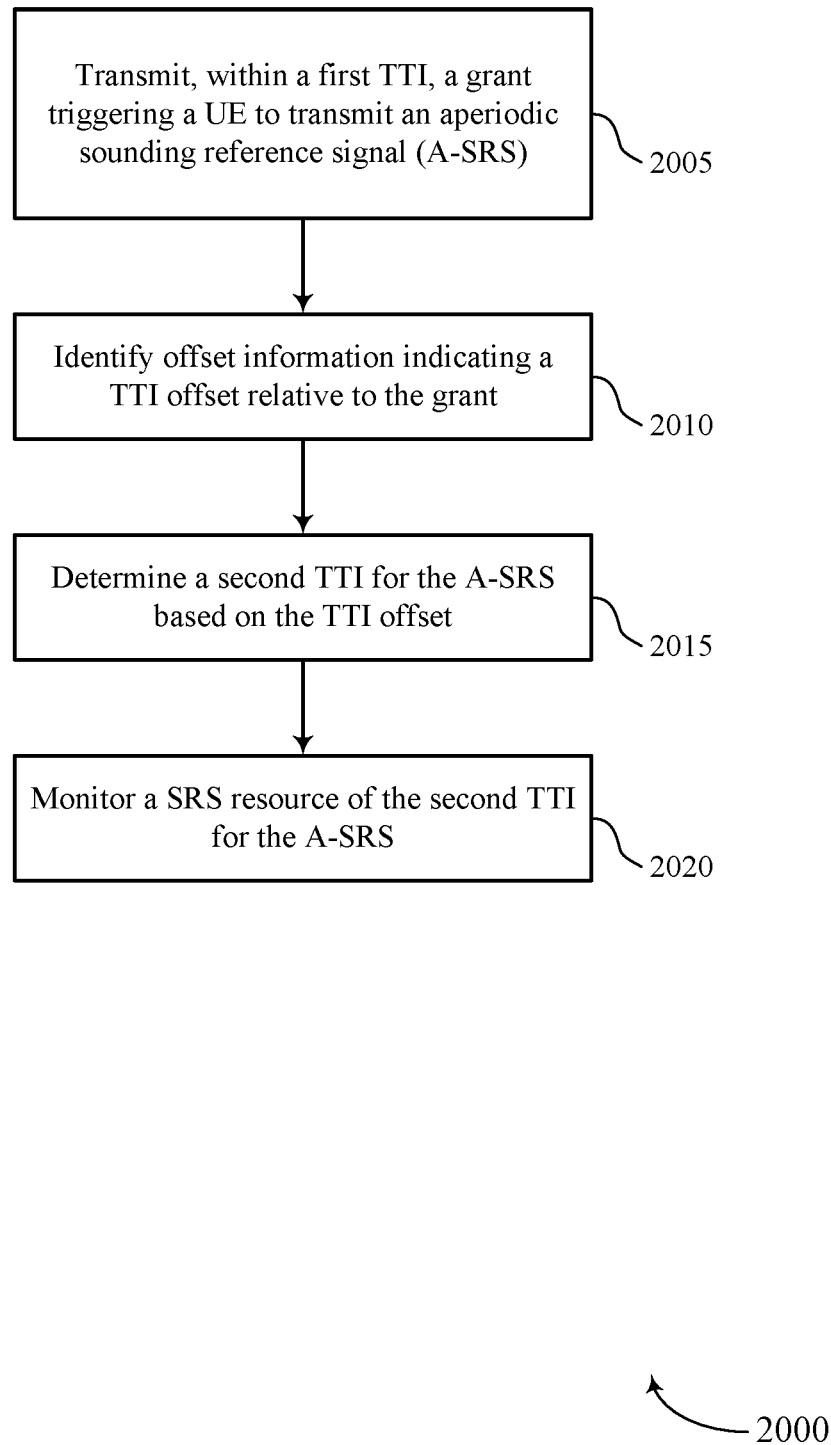

FIG. 20 shows a flowchart illustrating a method 2000 for reference signal transmission and triggering in accordance with aspects of the present disclosure. The operations of method 2000 may be implemented by a base station 105 or its components as described herein. For example, the operations of method 2000 may be performed by a base station communications manager as described with reference to FIGS. 12 through 15. In some examples, a base station 105 may execute a set of codes to control the functional elements of the device to perform the functions described below. Additionally, or alternatively, the base station 105 may perform aspects of the functions described below using special-purpose hardware.

At 2005 the base station 105 may transmit, within a first transmission time interval (TTI), a grant triggering a user equipment (UE) to transmit an aperiodic sounding reference signal (A-SRS). The operations of 2005 may be performed according to the methods described herein. In certain examples, aspects of the operations of 2005 may be performed by a resource grant component as described with reference to FIGS. 12 through 15.

At 2010 the base station 105 may identify offset information indicating a TTI offset relative to the grant. The operations of 2010 may be performed according to the methods described herein. In certain examples, aspects of the operations of 2010 may be performed by an offset information component as described with reference to FIGS. 12 through 15.

At 2015 the base station 105 may determine a second TTI for the A-SRS based at least in part on the TTI offset. The operations of 2015 may be performed according to the methods described herein. In certain examples, aspects of the operations of 2015 may be performed by a TTI identifier component as described with reference to FIGS. 12 through 15.

At 2020 the base station 105 may monitor an SRS resource of the second TTI for the A-SRS. The operations of 2020 may be performed according to the methods described herein. In certain examples, aspects of the operations of 2020 may be performed by a monitoring component as described with reference to FIGS. 12 through 15.

Figure 21:
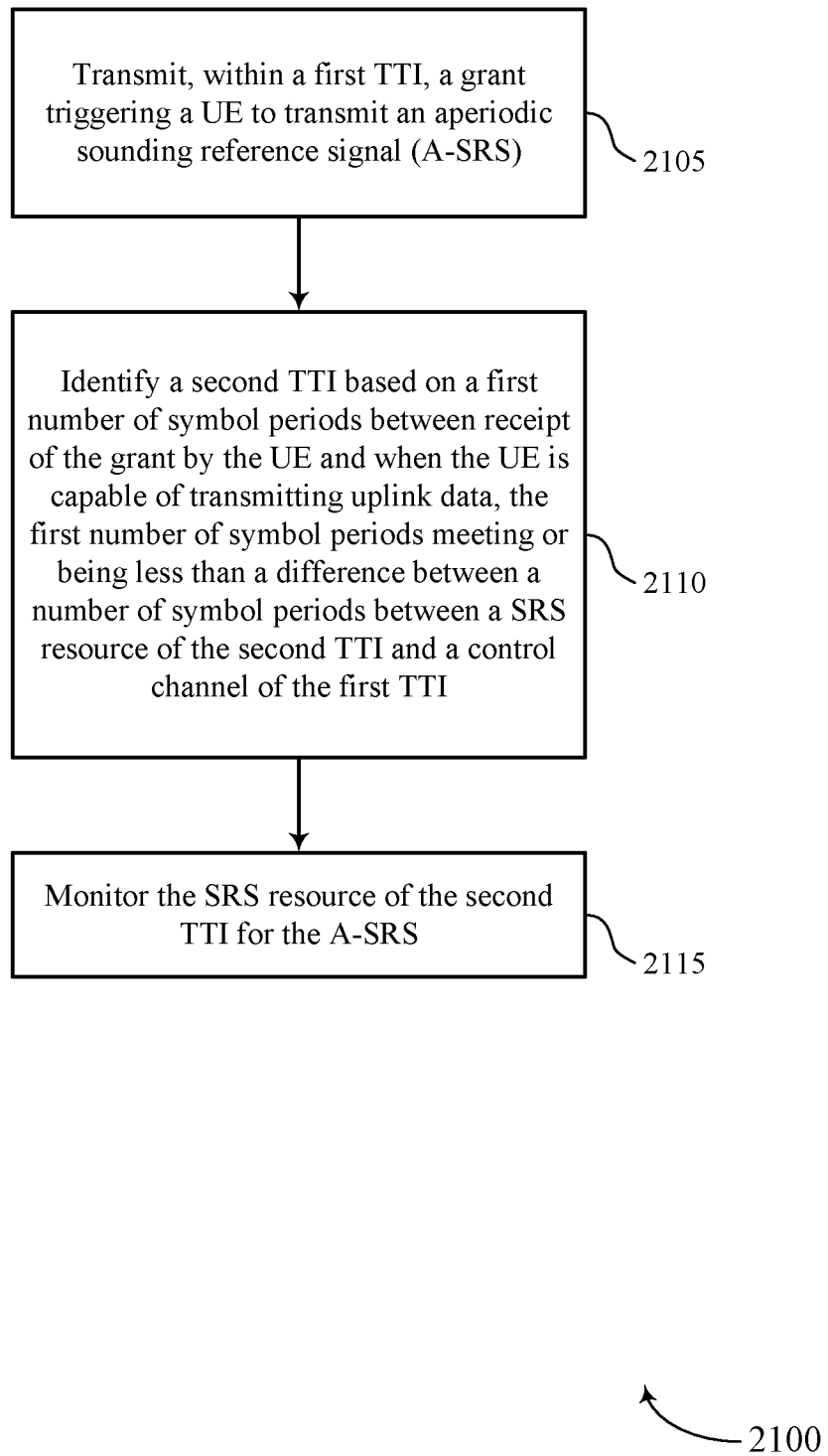

FIG. 21 shows a flowchart illustrating a method 2100 for reference signal transmission and triggering in accordance with aspects of the present disclosure. The operations of method 2100 may be implemented by a base station 105 or its components as described herein. For example, the operations of method 2100 may be performed by a base station communications manager as described with reference to FIGS. 12 through 15. In some examples, a base station 105 may execute a set of codes to control the functional elements of the device to perform the functions described below. Additionally, or alternatively, the base station 105 may perform aspects of the functions described below using special-purpose hardware.

At 2105 the base station 105 may transmit, within a first transmission time interval (TTI), a grant triggering a user equipment (UE) to transmit an aperiodic sounding reference signal (A-SRS). The operations of 2105 may be performed according to the methods described herein. In certain examples, aspects of the operations of 2105 may be performed by a resource grant component as described with reference to FIGS. 12 through 15.

At 2110 the base station 105 may identify a second TTI based at least in part on a first number of symbol periods between receipt of the grant by the UE and when the UE is capable of transmitting uplink data, the first number of symbol periods meeting or being less than a difference between a number of symbol periods between an SRS resource of the second TTI and a control channel of the first TTI. The operations of 2110 may be performed according to the methods described herein. In certain examples, aspects of the operations of 2110 may be performed by a TTI identifier component as described with reference to FIGS. 12 through 15.

At 2115 the base station 105 may monitor the SRS resource of the second TTI for the A-SRS. The operations of 2115 may be performed according to the methods described herein. In certain examples, aspects of the operations of 2115 may be performed by a monitoring component as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   transmitting capability information indicating that the UE is capable of transmitting an uplink transmission comprising a sounding reference signal in a same transmission time interval (TTI) in which a grant is received;
   detecting, within a first TTI, a grant triggering the UE to transmit an aperiodic sounding reference signal (A-SRS);
   identifying offset information indicating a TTI offset relative to the detected grant, the offset information based at least in part on the capability information;
   determining a second TTI for transmitting the A-SRS based at least in part on the TTI offset and the capability information; and
   transmitting the A-SRS in an SRS resource of the second TTI.

2. The method of claim 1, further comprising:
   receiving configuration information that configures the UE to transmit the A-SRS within at least one symbol index of a plurality of different symbol indexes of a TTI, wherein transmitting the A-SRS in the SRS resource of the second TTI further comprises:
   transmitting the A-SRS within at least one symbol period of the second TTI corresponding to the at least one symbol index.

3. The method of claim 1, wherein identifying the offset information further comprises:
   receiving the offset information in control signaling, wherein the offset information indicates a delay corresponding to a number of TTIs occurring between receipt of the detected grant by the UE and when the UE is instructed to transmit in accordance with the detected grant.

4. The method of claim 3,
   wherein the delay corresponds to the capability information.

5. The method of claim 3, wherein the delay corresponds to a specified capability information indicating a number of symbol periods between receipt of the detected grant by the UE and when the UE is capable of transmitting uplink transmissions in accordance with the detected grant.

6. The method of claim 1, further comprising:
   receiving downlink control information of the first TTI that includes the offset information, wherein the detected grant indicates resources of a shared data channel allocated to the UE for transmission of uplink transmissions, and wherein the offset information comprises a bit flag indicating whether the UE is to use a first value for the TTI offset indicated in the downlink control information or a second value for the TTI offset.

7. The method of claim 6, further comprising:
   receiving control signaling semi-statically indicating a defined value, wherein the second value for the TTI offset is a function of the first value for the TTI offset and the defined value.

8. The method of claim 7, wherein the first value indicates a gap in TTIs between the detected grant requesting the uplink transmission and transmission of the uplink transmission, and the second TTI is a TTI occurring prior to a TTI corresponding to the first value.

9. The method of claim 1, further comprising:
   receiving downlink control information of the first TTI that includes the offset information, wherein the detected grant indicates resources of a shared data channel allocated to the UE for reception of downlink data.

10. The method of claim 9, wherein the offset information is a bit sequence included within downlink control information of the first TTI, the bit sequence corresponding to a number of TTIs occurring between receipt of the detected grant by the UE and when the UE is instructed to transmit uplink transmissions in accordance with the detected grant.

11. The method of claim 1, wherein identifying the second TTI further comprises:
    identifying the second TTI as being offset from the first TTI by the TTI offset.

12. The method of claim 1, wherein identifying the second TTI comprises:
    determining that the TTI offset is a zero TTI offset, wherein the second TTI and the first TTI are a same TTI.

13. The method of claim 1, wherein identifying the offset information further comprises:
    receiving control signaling that semi-statically configures the UE with the offset information.

14. The method of claim 1, wherein identifying the offset information further comprises:
    receiving downlink control information of the first TTI that includes the offset information for dynamically configuring the UE with the TTI offset.

15. The method of claim 1, wherein identifying the offset information further comprises:
    retrieving the offset information from memory, wherein the UE is preconfigured with the offset information.

16. A method for wireless communication at a user equipment (UE), comprising:
    transmitting capability information indicating that the UE is capable of transmitting an uplink transmission comprising a sounding reference signal in a same transmission time interval (TTI) in which a grant is received;
    detecting, within a first TTI, a grant triggering the UE to transmit an aperiodic sounding reference signal (A-SRS);
    identifying a second TTI based at least in part on a first number of symbol periods between receipt of the grant by the UE and when the UE is capable of transmitting the uplink transmission, the first number of symbol periods meeting or being less than a difference between a number of symbol periods between an SRS resource of the second TTI and a control channel of the first TTI; and
    transmitting the A-SRS in the SRS resource of the second TTI.

17. The method of claim 16, further comprising:
    receiving configuration information that configures the UE to transmit the A-SRS within at least one symbol index of a plurality of different symbol indexes of a TTI, wherein transmitting the A-SRS in the SRS resource of the second TTI further comprises:
transmitting the A-SRS within at least one symbol period of the second TTI corresponding to the at least one symbol index.

18. A method for wireless communication at a base station, comprising:
receiving capability information indicating that a user equipment (UE) is capable of transmitting an uplink transmission comprising a sounding reference signal in a same transmission time interval (TTI) in which a grant is received;
transmitting, within a first TTI, a grant triggering the UE to transmit an aperiodic sounding reference signal (A-SRS);
identifying offset information indicating a TTI offset relative to the transmitted grant, the offset information based at least in part on the capability information;
determining a second TTI for the A-SRS based at least in part on the TTI offset and the capability information; and
monitoring an SRS resource of the second TTI for the A-SRS.

19. The method of claim 18, further comprising:
transmitting configuration information to configure the UE to transmit the A-SRS within at least one symbol index of a plurality of different symbol indexes of a TTI, wherein monitoring the SRS resource of the second TTI for the A-SRS further comprises:
monitoring at least one symbol period of the second TTI corresponding to the at least one symbol index for the A-SRS.

20. The method of claim 18, further comprising:
transmitting, within the first TTI, downlink control information that includes the offset information, wherein the offset information indicates a delay corresponding to a number of TTIs occurring between receipt of the transmitted grant by the UE and when the UE is instructed to transmit uplink transmissions in accordance with the transmitted grant.

21. The method of claim 20,
wherein the delay corresponds to the capability information.

22. The method of claim 20, wherein the delay corresponds to a specified capability information indicating a number of symbol periods between receipt of the transmitted grant by the UE and when the UE is capable of transmitting uplink transmissions in accordance with the transmitted grant.

23. The method of claim 18, further comprising:
transmitting downlink control information in the first TTI that includes the offset information, wherein the transmitted grant indicates resources of a shared data channel allocated to the UE for transmission of uplink data, wherein the offset information comprises a bit flag indicating whether the UE is to use a first value for the TTI offset indicated in the downlink control information or a second value for the TTI offset.

24. The method of claim 18, further comprising:
transmitting downlink control information in the first TTI that includes the offset information, wherein the transmitted grant indicates resources of a shared data channel allocated to the UE for reception of downlink data.

25. The method of claim 18, wherein identifying the second TTI further comprises:
identifying the second TTI as being offset from the first TTI by the TTI offset.

26. The method of claim 18, further comprising:
receiving the A-SRS within the SRS resource of the second TTI;
generating a channel measurement based at least in part on the received A-SRS; and
generating a frequency dependent scheduling decision based at least in part on the channel measurement.

27. The method of claim 18, wherein identifying the second TTI comprises:
determining that the TTI offset is a zero TTI offset, wherein the second TTI and the first TTI are a same TTI.

28. A method for wireless communication at a base station, comprising:
receiving capability information indicating that a user equipment (UE) is capable of transmitting an uplink transmission comprising a sounding reference signal in a same transmission time interval (TTI) in which a grant is received;
transmitting, within a first TTI, a grant triggering the UE to transmit an aperiodic sounding reference signal (A-SRS);
identifying a second TTI based at least in part on a first number of symbol periods between receipt of the grant by the UE and when the UE is capable of transmitting the uplink transmission, the first number of symbol periods meeting or being less than a difference between a number of symbol periods between an SRS resource of the second TTI and a control channel of the first TTI; and
monitoring the SRS resource of the second TTI for the A-SRS.

29. The method of claim 28, further comprising:
transmitting configuration information to configure the UE to transmit the A-SRS within at least one symbol index of a plurality of different symbol indexes of a TTI, wherein monitoring the SRS resource of the second TTI for the A-SRS further comprises:
monitoring the A-SRS within at least one symbol period of the second TTI corresponding to the at least one symbol index.

* * * * *